(12) United States Patent
Narushima et al.

(10) Patent No.: US 8,599,412 B2
(45) Date of Patent: Dec. 3, 2013

(54) PRINTING SYSTEM AND METHOD OF CONTROLLING PRINTER DEVICE

(75) Inventors: Toshio Narushima, Kanagawa (JP); Tetsuya Mitani, Kanagawa (JP); Ryusuke Furuhashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 503 days.

(21) Appl. No.: 13/011,015

(22) Filed: Jan. 21, 2011

(65) Prior Publication Data

US 2011/0188075 A1 Aug. 4, 2011

(30) Foreign Application Priority Data

Jan. 29, 2010 (JP) ................. P2010-019261

(51) Int. Cl.
*G06F 3/12* (2006.01)
(52) U.S. Cl.
USPC ......... 358/1.15; 358/1.14; 358/419; 358/420; 358/421; 358/422; 358/423; 358/443; 713/300; 713/330; 713/340

(58) Field of Classification Search
None
See application file for complete search history.

(56) References Cited

U.S. PATENT DOCUMENTS

| 7,747,887 | B2* | 6/2010 | Shipton et al. | 713/340 |
|---|---|---|---|---|
| 7,894,085 | B2* | 2/2011 | Maeda | 358/1.13 |
| 8,365,002 | B2* | 1/2013 | Narushima | 713/340 |
| 2011/0058214 | A1* | 3/2011 | Park et al. | 358/1.15 |
| 2011/0157645 | A1* | 6/2011 | Okutsu | 358/1.15 |

* cited by examiner

*Primary Examiner* — Hilina K Demeter
(74) *Attorney, Agent, or Firm* — Frommer Lawrence & Haug LLP; William S. Frommer

(57) ABSTRACT

A printing system has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power of the print engine by a print request from the external equipment to perform the print processing in a printer standby state in which the electric power of the print engine is reduced while maintaining the communication function of the communication control portion.

17 Claims, 13 Drawing Sheets

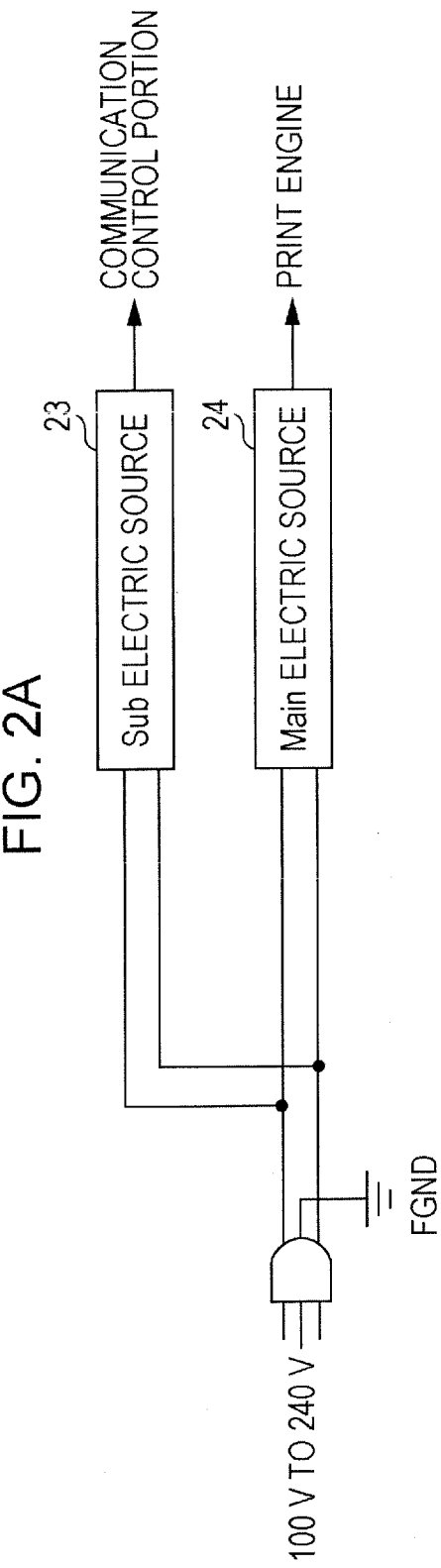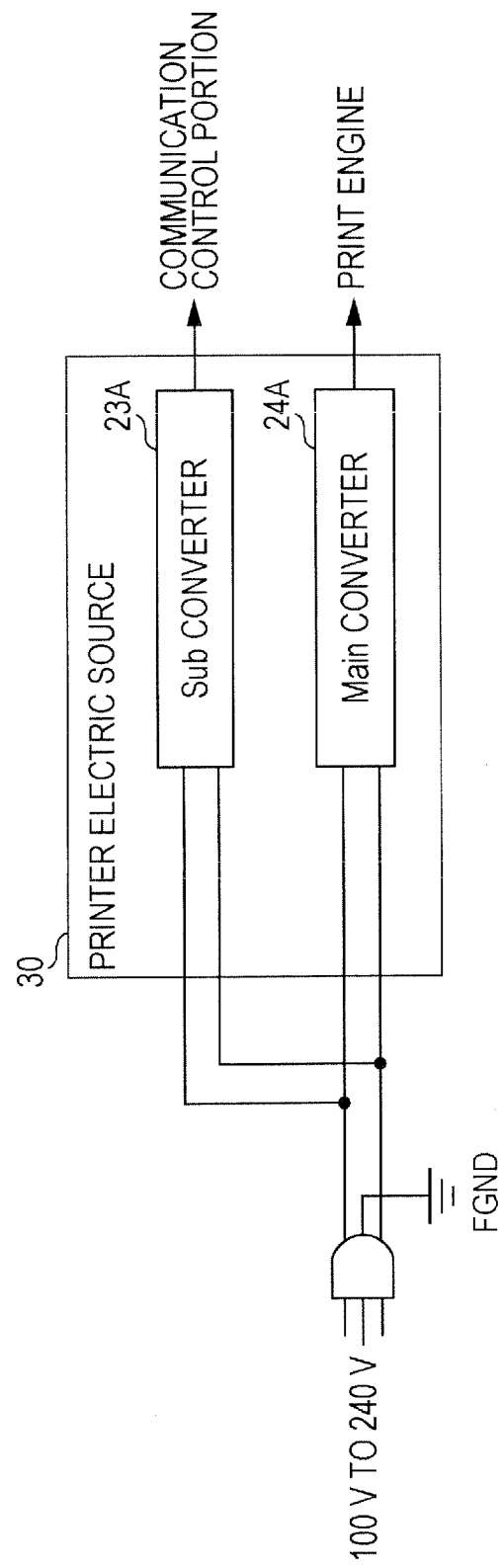

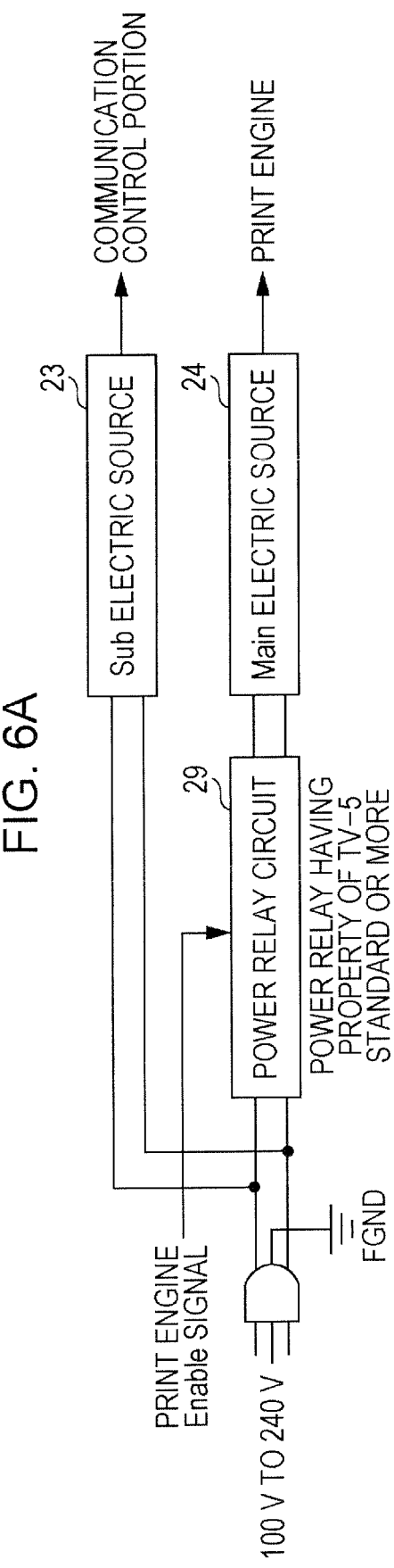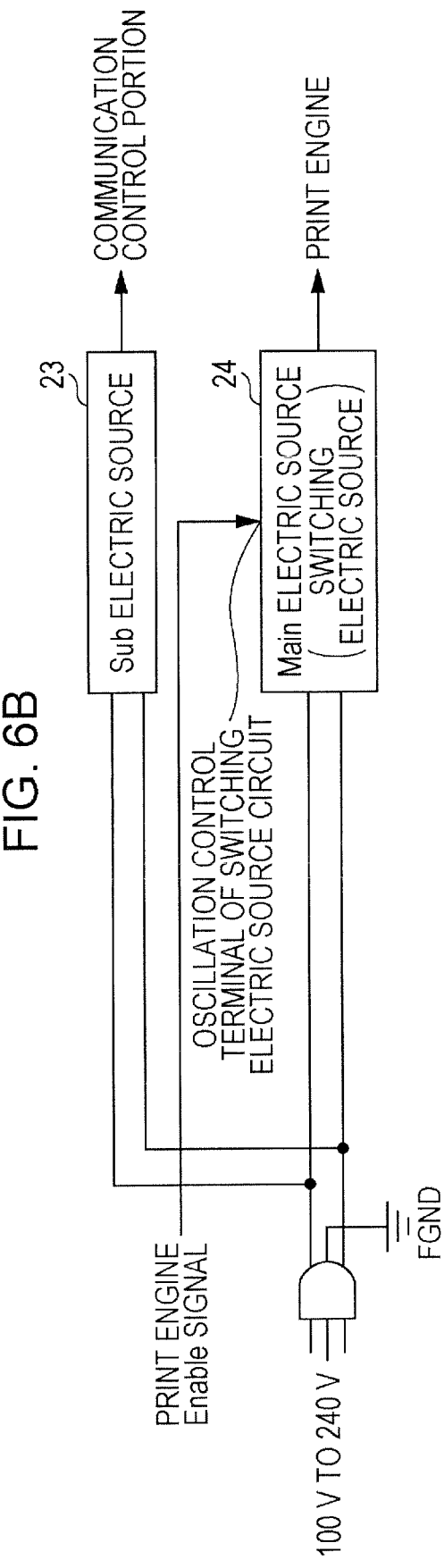

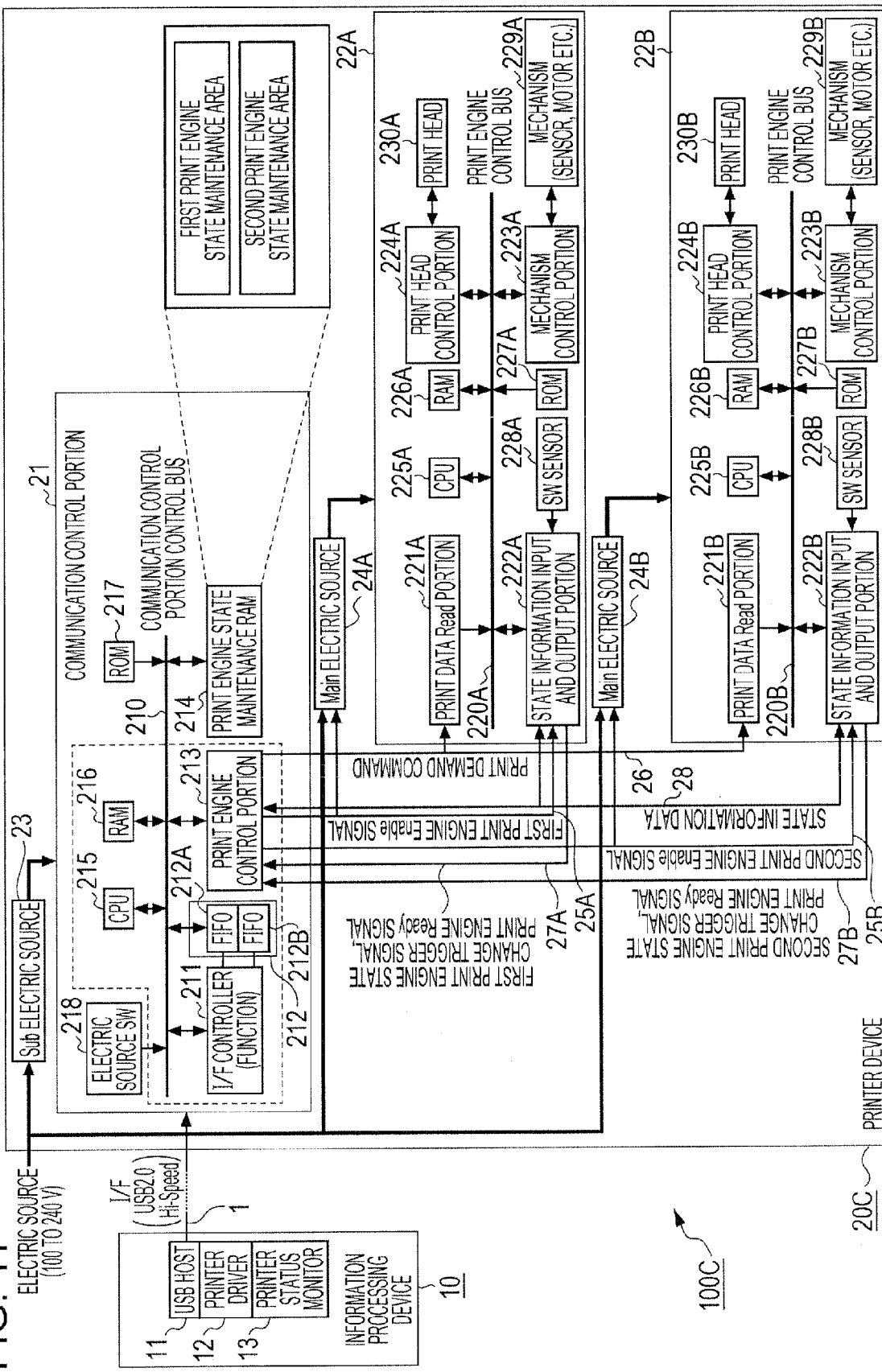

PRINTING SYSTEM AND METHOD OF CONTROLLING PRINTER DEVICE

BACKGROUND OF THE INVENTION

1. Field of the Invention

The present invention relates to a printing system having a printer device which includes a communication control portion and a print engine carrying out a print processing, is connected to external equipment by the communication function of the communication control portion via a USB interface, and inputs the electric power into the print engine by a print request from the external equipment to perform the print processing in a printer standby state in which the electric power of the print engine is reduced while maintaining the communication function of the communication control portion, and an information processing device to be connected to the printer device as external equipment via the USB interface, and a method of controlling the printer device in the printing system.

2. Description of the Related Art

In recent years, in response to a worldwide upsurge of interest in energy problems and environmental problems, a reduction in electric power consumption by electronic equipment or the like used in daily life is further necessary, and restrictions such as an EuP command (Directive on Eco-Design of Energy-Using Products) or an International Energy Star Program Ver 1.1 have been implemented.

Hitherto, in such electronic equipment or the like, during non-use after the electric power input, a standby low electric power consumption mode for shutting off the electric power supply to an unnecessary circuit or the like to automatically lead to a reduction in electric power consumption is set.

For example, in an image forming device such as a printer and a facsimile machine, it is configured so that, when a certain time elapses in the state in which no input signal is detected, a process is automatically shifted to "a standby low electric power consumption mode", and an electric except for a circuit for performing the transmission and the reception of various data the electric source of unnecessary circuits is turned off, and when an image data or the like is received from the external equipment, the electric source of each circuit is returned to the on state, whereby the print operation is started up.

For example, there is a suggestion in which, even if the image forming device is in a low electric power consumption state, in a case of responding to a status received from a network, the response is carried out at an extremely low energy level and at a low cost (for example, see Japanese Unexamined Patent Application Publication No. 2009-153192). In a technique disclosed in Japanese Unexamined Patent Application Publication No. 2009-153192, an image forming device has a main CPU that is in a sleep mode and a sub CPU that has a lower electric power consumption and is not in the sleep mode, switches over such that the status information detected by a status detection unit is connected to the main CPU during a non-sleep mode and is connected to the sub CPU during the sleep mode, and is configured so that the sub CPU responds to a query from the outside during the sleep mode without starting up the electric source of the main CPU or the print portion. When the sub CPU receives the command from the outside, after determining the necessity of the sleep mode release, the sub CPU performs the start up of the necessary electric source. As the status information, each door/cassette open and close detection, an optional equipment connection detection or the like are described.

Furthermore, in a network system which was divided from the basic application Japanese Unexamined Patent Application Publication No. 2009-153192, with respect to the status query, an image forming device responds thereto during the non-sleep mode, and the system commands the server to perform a response proxy and relays the status information at the time of the shift to the sleep mode, and the server requests the image forming device to return from the sleep mode when the status is changed during the sleep mode (for example, see Japanese Unexamined Patent Application Publication No. 2004-133512).

Moreover, a method and a system for externally processing a service request in advance so as to prevent an unnecessary waking of a node during the sleep mode, thereby improving energy conservation are suggested (for example, see Japanese Unexamined Patent Application Publication No. 2009-070366).

In a technique disclosed in Japanese Unexamined Patent Application Publication No. 2009-070366, in a network which has a network interface that is not in the sleep mode, a node 1 having a component 1 that is in a light sleep mode and a component 2 that is in a hibernation mode, a node 2 managing the sleep mode and a node 3 that is a client, the node 1 relays the node 2 of the sleep mode profile when entering the sleep mode and transmits the request from the node 3 to the node 2 during the sleep mode. The node 2 responds to the node 3 or requests the node 1 to start up the component 1 or/and the component 2 depending on the transmitted request. In Japanese Unexamined Patent Application Publication No. 2009-029102, as the component 1, for example, a digital-based component is described, as the component 2, for example, a machine-based component such as a print engine is described, and as the network interface, a USB is also described.

Furthermore, there is a suggestion that it is determined whether the release of the electric power saving mode is necessary for a packet received during the electric power saving mode, thereby responding, if unnecessary, for example, while maintaining a non-print request ping packet, SNMP, http or the like and the electric power saving mode (for example, see Japanese Unexamined Patent Application Publication No. 2009-029102). In Japanese Unexamined Patent Application Publication No. 2009-029102, a storage point for the status information of the print engine is not described.

Furthermore, there is a suggestion that, in an image output device having a user authentication device, when a print job is received during the energy saving mode, the job is accumulated in an accumulation portion, a return processing is performed from the energy saving mode when the user authentication is done, and the job is transmitted from the accumulation portion after the return is confirmed, thereby promoting the suppression of the electric power consumption (for example, see Japanese Unexamined Patent Application Publication No. 2009-061634).

Moreover, an image forming device that can smoothly perform the return from the electric power saving state to a common electric power state is suggested (for example, see Japanese Unexamined Patent Application Publication No. 2008-205714). In a technique disclosed in Japanese Unexamined Patent Application Publication No. 2008-205714, in the image forming device having a plurality of functions, the return of electric power for each function is individually controlled depending on the user operation or the network communication. An operation portion, a network control device (FAX function), a network interface, and an electric power saving control unit are provided with the electric source constantly and are consulted when electric power returns, and the electric power saving control unit controls the electric connection situation of each function based on the information, generates a warning sound when an abnormality is generated in the return from electric power saving mode, and returns all of the functions from the electric power saving mode when an electric power monitoring system becomes abnormal.

Furthermore, an information notification device, which can suppress the electric power consumption to provide up to date equipment information within an image forming device when the acquisition request of the equipment information is received during the sleep mode, is suggested (for example, see Japanese Unexamined Patent Application Publication No. 2008-011319). In a technique disclosed in Japanese Unexamined Patent Application Publication No. 2008-011319, when an information notification device storing the equipment information indicating the print engine status receives the request of the equipment information from the outside while a print engine is not supplied with electric power, if within a predetermined time from the equipment information acquisition, the device relays the stored equipment information while stopping the electric power supply to the print engine, and if a predetermined time elapses, the device returns the electric power supply to the print engine, acquires and relays the equipment information from the print engine.

Moreover, there is a suggestion that, in an image forming device including an electric power management function, the information of the device is collected so that the power supply of the overall device may not be resumed upon entering an electric power management state, and the power supply of only a part of the device is resumed when an information processing device receives the resume signal (for example, see Japanese Unexamined Patent Application Publication No. 2006-172044). In a technique disclosed in Japanese Unexamined Patent Application Publication No. 2006-172044, in the image forming device including the electric source management function, a partial return unit, in which only a partial function is returned upon receiving the resume request is included, and the content of the resume request is determined, thereby deciding the portion to be returned. When the status information is stored before entering the sleep mode and the request of the status information is received from the outside, the power supply is only returned to a control portion and responds thereto. As the status information, an ink residual quantity, a paper residual quantity, error information or the like are described.

Moreover, an image forming device, which is adapted to suppress the electric power from being unnecessarily consumed when an abnormality is generated during the energy conservation mode, is suggested (for example, see Japanese Unexamined Patent Application Publication No. 2005-165061). In a technique disclosed in Japanese Unexamined Patent Application Publication No. 2005-165061, when an abnormality is generated during the power conservation mode of the image forming device, the generation of abnormality is relayed without releasing the power conservation mode. As the generated abnormality, a communication error and a device error are described.

Moreover, a printer device, which does not perform the reading of the information from a memory element on a printing cartridge at the time of operation in the power conservation mode, and is configured so as not to output the information of incorrect content as information on the printing cartridge even when the printing cartridge is changed during operation to the power conservation mode, is suggested (for example, see Japanese Unexamined Patent Application Publication No. 2005-111818). In a technique disclosed in Japanese Unexamined Patent Application Publication No. 2005-111818, when a storage unit storing the cartridge information is included and the cartridge change is sensed during the electric power saving mode, the electric power saving mode is released, the cartridge information is acquired again, and the information stored in the storage unit is renewed. In a case of having to output the information on the cartridge status, the information stored in the storage unit is output regardless of the power conservation mode (while the information is maintained at the time of power conservation mode). There is a description in which the cartridge change is sensed by the cartridge itself or sensed through the opening and closing of a cover.

Furthermore, there is a suggestion that, in an information processing device, even when there is a query about the status, a low electric power consumption mode of a portion other than a network interface is not interrupted (for example, see Japanese Unexamined Patent Application Publication No. 2003-076451). In a technique disclosed in Japanese Unexamined Patent Application Publication No. 2003-076451, a CPU portion controlling the overall information processing device, a print portion, a status storage portion that stores the status of the print portion, a network portion, and a sub CPU that controls the network portion are included, the portions other than the network portion can be shifted to the electric power saving mode. When the network portion receives the query request at the time of electric power saving mode, the sub CPU consults the status storage portion (while maintaining the electric power saving mode) and directly responds thereto.

In addition, a printer control system which can reduce the electric power consumption while maintaining the print efficiency is suggested (for example, see Japanese Unexamined Patent Application Publication No. 2002-244833). In a technique disclosed in Japanese Unexamined Patent Application Publication No. 2002-244833, a plurality of printers, a printer control device, and a plurality information processing devices are connected to each other via a network. When the print request does not exist for a predetermined time, the printers are shifted to the electric power saving mode, but an agency processing entrustment request including the printer information (the function, the paper size or the like) is transmitted to the printer control device at that time. While the printer in the electric power saving mode, the printer control device interprets the packet to be sent to the printer, accumulates the same in the case of print request and returns the printer from the electric power saving mode, and stops the packet procuracy reception when the start up is finished, thereby transmitting the accumulated print request to the printer.

SUMMARY OF THE INVENTION

As described above, as a method for promoting the low electric power consumption, for example, the electric source was supplied to only the portion which was necessary for the communication and the electric source for the unnecessary portion was shut-off or reduced.

Furthermore, by making a portion which supplies the electric source one chip as a minimum circuit, low electric power consumption was promoted.

Moreover, in addition to the main CPU, by providing a sub CPU (a standby CPU) that controls the communication during standby, the low electric power consumption was promoted.

In addition, by providing the main electric source and the sub electric source, the low electric power consumption was promoted.

In this manner, in the method of the related art, during standby, the electric power is supplied from the sub electric source only to the minimum standby CPU circuit relating to the communication control, and when the print processing is started up, the electric power is supplied from the main electric source to the print engine including the main CPU.

During standby in the method of the related art, the standby CPU monitors an interface status through a printer interface circuit and the main CPU is in the electric power OFF state. When there is a print request access from the interface, the printer interface circuit relays it to the standby CPU and the standby CPU starts up the main CPU. When the main CPU wakes to an operable normal state, the main CPU is connected to the printer interface circuit in place during standby CPU and performs a response/print processing by receiving the print request access including the print data.

In this manner, in the method of the related art, there was a problem in that the standby CPU was operated during standby and the main CPU was operated in the process of printing, whereby the standby CPU did not function in the process of printing. In addition, there was a problem in that, since the main CPU performed the print processing in the process of printing, the main CPU does not perform other processing relating to the interface other than the print processing, whereby it was difficult to rapidly respond to another processing request from the interface.

Moreover, the method of the related art did not have a configuration in which a plurality of print engines can be attached to and detached from the standby CPU while reducing the electric power consumption during standby, with respect to the print request from the information processing device, the standby CPU controls the plurality of print engines and starts up an optimal print engine in order to print.

Thus, it is desirable to provide a printing system and a control method of a printer device that can reduce a standby electric power consumption of a printer device to the extent that each country regulation and various regulations can be cleared while maintaining an interface with external equipment in an efficient state.

Specific advantages that can be obtained by the present invention are further apparent from the description of embodiments described later.

According to an embodiment of the present invention, there is provided a printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power into the print engine by a print request from the external equipment to perform the print processing in a printer standby state in which the electric power of the print engine is reduced while maintaining the communication function of the communication control portion; wherein a communication control portion processes a control transmission command, the print engine processes a bulk OUT transmission command, a communication control portion CPU accesses a control transmission end point FIFO buffer, and a print engine CPU accesses a bulk OUT transmission end point FIFO buffer, thereby cutting-off/reducing the electric power of the print engine while maintaining the USB interface function of the printer device that performs the USB communication.

That is, according to an embodiment of the present invention, there is provided a printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power of the print engine by a print request from the external equipment to perform the print processing in a printer standby state in which the electric power of the print engine is reduced while maintaining the communication function of the communication control portion, wherein, in the printer device, in a state in which a control transmission using a default pipe that is a logical connection of the USB interface and a bulk OUT transmission using a pipe that is a logical connection established after carrying out a configuration of the USB interface can be established between the printer device and the external equipment, the communication control portion responds to and deals with various commands using the control transmission from the external equipment, the communication control portion does not respond and deal with the print request command including the print data using the bulk OUT transmission from the external equipment, the print request command is transmitted from the communication control portion to the print engine in the original command state without changing the content thereof, and the print engine responds to and deals with the print request command transmitted from the communication control portion, whereby the print processing is carried out according to the print data in the print request command.

Furthermore, according to another embodiment of the present invention, there is provided a method of controlling a printer device in a printing system which has the printer device including a communication control portion and a print engine carrying out a print processing, and an information processing device connected to the printer device as external equipment via a USB interface, the printer device being connected to external equipment by the communication function of the communication control portion via a USE interface, and inputting the electric power of the print engine by a print request from the external equipment to perform the print processing in a printer standby state in which the level of electric power of the print engine is reduced while maintaining the communication function of the communication control portion, wherein, in a state in which a control transmission using a default pipe that is a logical connection of the USB interface and a bulk OUT transmission using a pipe that is a logical connection established after carrying out a configuration of the USB interface can be established between the external equipment and the printer device; the communication control portion responds to and deals with various commands using the control transmission from the external equipment to the printer device; and the communication control portion does not respond to and deal with the print request command including the print data using the bulk OUT transmission from the external equipment to the printer device, the print request command is supplied from the communication control portion to the print engine in the original command state without changing the content thereof, and the print engine responds to and deals with the print request command, whereby the print processing is carried out according to the print data in the print request command.

Moreover, according to another embodiment of the present invention, there is provided a printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power of the print engine by a print request from the external equipment to perform the print processing in a printer standby state in which the electric power of the print engine is reduced while maintaining the communication function of the communication control portion, wherein the printer device enables a control transmission using a default pipe that is a logical connection of the USB interface and a bulk OUT transmission using a pipe that is a logical connection established after carrying out a configuration of the USB interface between the printer device and the external equipment, a control transmission end point FIFO buffer for the control transmission and a bulk OUT transmission end point buffer for the bulk OUT transmission exist in the communication control portion, a communication control CPU within the communication control portion accesses the control transmission end point FIFO buffer, a control CPU in the print engine accesses the bulk OUT transmission end point FIFO buffer, and when the print request command including the print data using the bulk OUT transmission is sent from the external equipment, the control CPU in the print engine directly reads the print request command from the bulk OUT transmission end point FIFO buffer within the communication control portion, thereby carrying out the print processing corresponding to the print data included in the print request command in the print engine.

In addition, according to another embodiment of the present invention, there is provided a method of controlling a printer device in a printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power of the print engine by a print request from the external equipment to perform the print processing in a printer standby state in which the electric power of the print engine is reduced while maintaining the communication function of the communication control portion, wherein a control transmission using a default pipe that is a logical connection of the USB interface and a bulk OUT transmission using a pipe that is a logical connection established after carrying out a configuration of the USB interface can be performed between the external equipment and the printer device, and there is a control transmission end point FIFO buffer for the control transmission and a bulk OUT transmission end point FIFO buffer for the bulk OUT transmission in the communication control portion of the printer device, a communication control CPU within the communication control portion accesses the control transmission end point FIFO buffer, a control CPU in the print engine accesses the bulk OUT transmission end point FIFO buffer, when the print request command including the print data using the bulk OUT transmission is sent from the external equipment, the control CPU in the print engine directly reads the print request command from the bulk OUT transmission end point FIFO buffer within the communication control portion, thereby carrying out the print processing corresponding to the print data included in the print request command in the print engine.

In an embodiment of the present invention having such a configuration, it is possible to reduce the standby electric power consumption of the printer device to the extent that each country's restriction and various restrictions can be satisfied, while maintaining an interface between the printer device and the external equipment in an efficient state.

In addition, in an embodiment of the present invention, the communication control portion of the printer device responds to and deals with the command of the control transmission and the print engine deals with the command of the bulk OUT transmission regardless of the standby state and the normal state, whereby each CPU can effectively perform the distribution processing, and thus, it is possible to speed up the response and the dealing with of the command of the control transmission even in the process of printing processing.

Furthermore, in an embodiment of the present invention, since the communication control CPU of the communication control portion of the printer device can grasp the print engine status information without starting up the print engine, even when the status of the printer device is queried by the external equipment, only the communication control CPU can respond to the information processing device.

Moreover, in an embodiment of the present invention, even when an error state occurs in the print engine, the communication control CPU of the communication control portion of the printer device can perform an error response to the external equipment without starting up the print engine with respect to the print request from the external equipment.

Furthermore, in an embodiment of the present invention, even in a case where the electric source of the print engine of the printer device is cut-off or reduced, when a status change of the print engine occurs, the change can be notified to the communication control CPU, which makes it possible to perform a suitable processing to the status change.

Moreover, in an embodiment of the present invention, since a level, in which the electric power of the print engine of the printer device is cut-off or reduced, can be selected and set, it is possible to obtain a user operability which is suitable and favorable for various electric power consumption restrictions during standby that differ for each country or region.

Furthermore, in an embodiment of the present invention, the printer device includes a plurality of print engines that can be attached and detached, the communication control CPU of the communication control portion can select and control the plurality of print engines with respect to the print request from the information processing device, and can start and print an optimal print engine.

Moreover, in an embodiment of the present invention, the printer device enables the plurality of print engines to be attached and detached, whereby the electric power consumption during standby can be reduced regardless of the connection number of the print engine.

In addition, in an embodiment of the present invention, even when the printer device is connected to the plurality of print engines, the communication control CPU of the communication control portion functions as a single printer device, whereby the external equipment can print using a plurality of print engines through the communication control CPU without exchanging the corresponding printer driver within the external equipment.

BRIEF DESCRIPTION OF THE DRAWINGS

FIGS. 2A and 2B are block diagrams showing electric source configuration examples of the printer device in the printing system;

FIGS. 6A and 6B are block diagrams showing control examples of an electric source supply of the printer device in the printing system;

FIG. 11 is a block diagram showing another configuration example of a printing system to which the present invention has been applied.

DESCRIPTION OF THE PREFERRED EMBODIMENTS

Hereinafter, preferred embodiments for carrying out the present invention will be specifically described in the following order with reference to the drawings.

Figure 12:
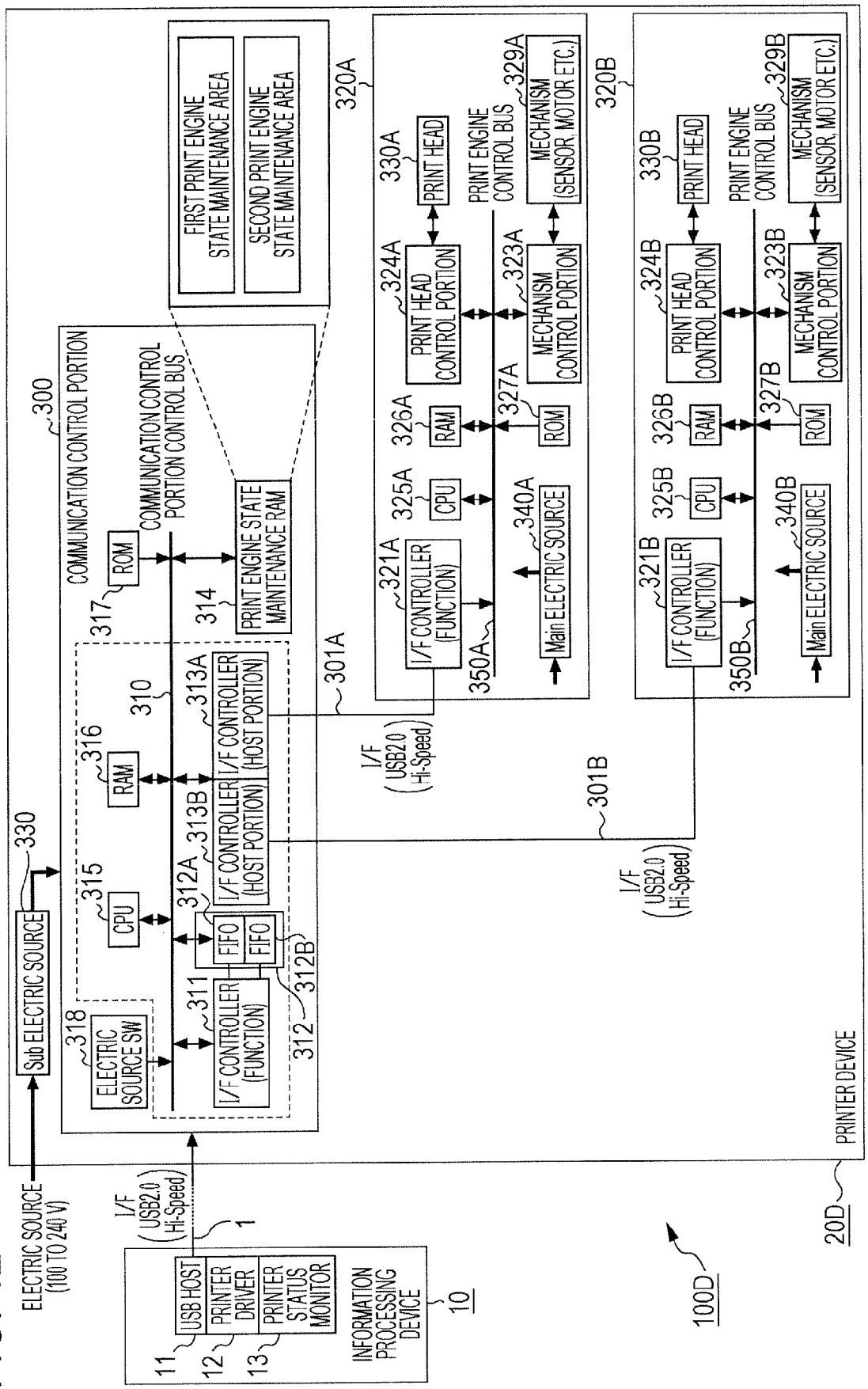
FIG. 12 is a block diagram showing still another configuration example of a printing system to which the present invention has been applied.

1. Explanation of Basic Configuration of Printing system (FIGS. 1 to 3B)
2. Explanation of First Detailed Example of Configuration of Printer Device (FIGS. 4 to 8)
3. Explanation of Second Detailed Example of Configuration of Printer Device (FIG. 9)
4. Explanation of Print Operation in a Printing System (FIGS. 10a and 10b)
5. Explanation of Third Detailed Example of Configuration of Printer Device (FIG. 11)
6. Explanation of Fourth Detailed Example of Configuration of Printer Device (FIG. 12)

1. Explanation of Basic Configuration of Printing system (FIGS. 1 to 3B)

Figure 1:
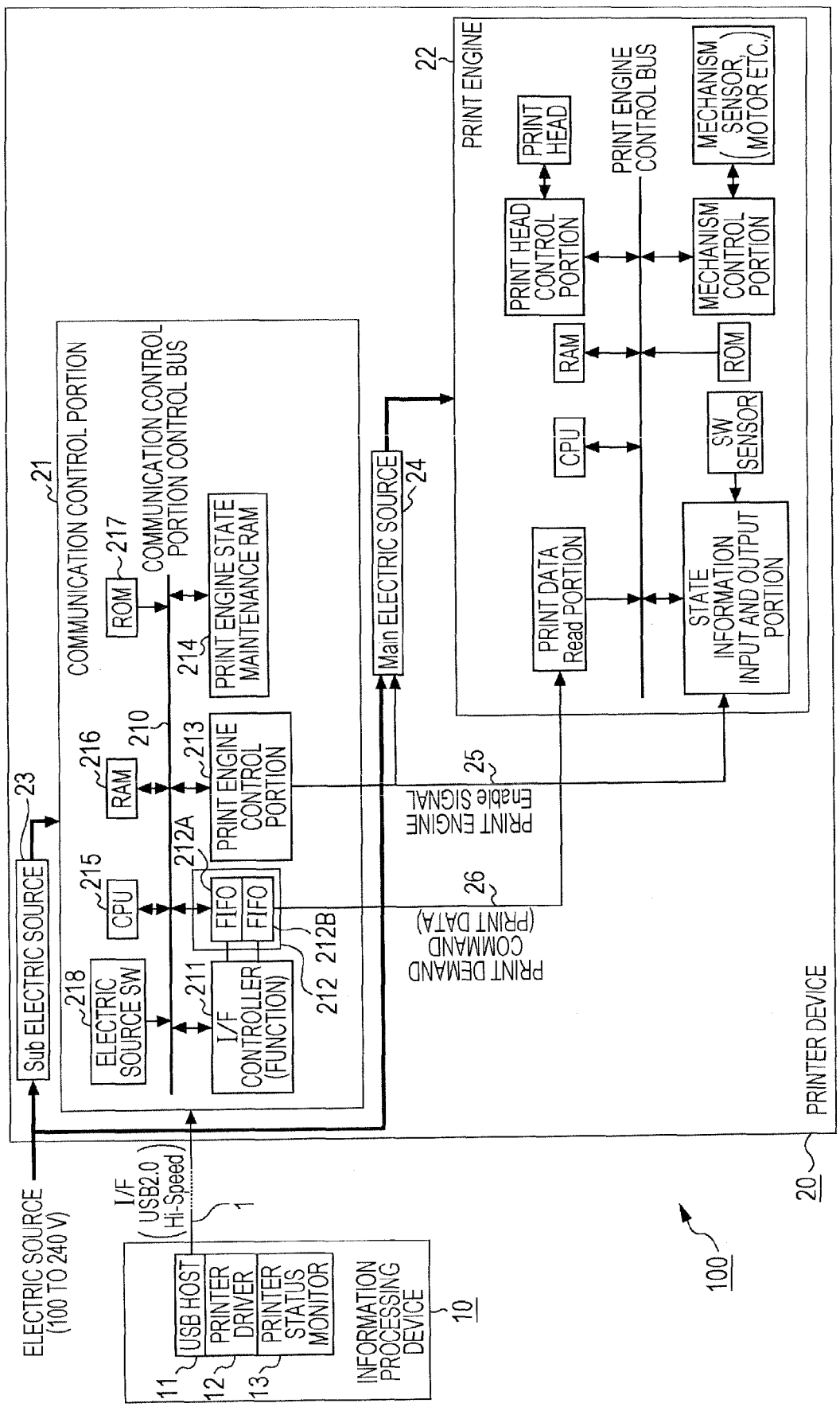
FIG. 1 is a block diagram showing a basic configuration example of a printing system to which the present invention has been applied.

The Present Invention is Applied to a Printing System 100 having a configuration, for example, shown in FIG. 1.

The printing system 100 includes an information processing device 10 and a printer device 20 to which the information processing device 10 is connected via a communication cable 1 based on a communication interface such as a USB (Universal Serial Bus) as external equipment.

As a connection between the information processing device 10 and the printer device 20, a connection using a USB interface is spread, but other interfaces may be used. In the case of a network printer, an Ethernet interface is spread. In the explanation of the printing system 100, the USB interface will be used.

Herein, the USB (Universal Serial Bus) is a general purpose interface bus standard corresponding to a plug and play which is replaced with a legacy port such as a serial port (RS-232C) or a parallel port. The specification of the USB was initially fixed by four companies starting from Intel Company U.S.A, but, presently, the fixing or the management of the specification is performed by USB Implementers Forum, Inc. (USB-IF) that is a NPO. USB 2.0 which realizes a High Speed mode (maximum 480 Mbps) capable of transmitting at high speed exceeding IEEE 1394 (maximum 400 Mbps) by standard is widely spread. Henceforth, it is expected that USB 3.0 realizing a Super Speed mode (maximum 5 Gbps), in which an additional new high speed transmission is realized, will be spread.

The information processing device 10 in the printing system 100 includes a general personal computer (PC) or the like. The information processing device 10 is a PC having a USB host function portion 11 suitable for the USB interface (USB 2.0 Hi-Speed) and is connected to the printer device 20 via the communication cable 1 suitable for the USB interface (USB 2.0 Hi-Speed). Furthermore, in the information processing device 10, a printer driver 12 and a printer status monitor 13 are installed.

Moreover, the printer device 20 in the printing system 100 includes a communication control portion 21, a print engine 22, a Sub electric source 23, and a Main electric source 24.

The communication control portion 21 includes a USB 2.0 function I/F controller 211, a storage portion 212, a print engine control portion 213, a print engine state maintenance RAM 214, a communication control CPU 215, a RAM 216, a ROM 217, an electric source switch 218 or the like that are connected to each other via a communication control portion control bus 210. The electric source switch 218 is a software power switch that cuts all or a part of a circuit connected to a secondary side output of the Sub electric source 23 by a firmware control of the communication control CPU 215.

The communication control portion 21 is driven by an electric source supplied from the Sub electric source 23. Furthermore, the communication control portion 21 controls the USB interface (USB 2.0 Hi-Speed) between it and the information processing device 10. Furthermore, the communication control portion 21 performs the electric power control on the Main electric source 24 and the print engine 22 by outputting the print engine Enable signal via a signal line 25. In addition, a print request command (print data) is supplied from the communication control portion 21 to the print engine 22 via a command/data line 26, whereby the print engine 22 carries out the print processing.

The print engine 22 is driven by the electric source supplied from the Main electric source 24.

The main electric source 24 enters the ON state and the electric source is supplied depending on the print engine Enable signal that is output from the communication control portion 21 via the signal line 25, whereby the print engine 22 is driven. In addition, the print engine 22 carries out the print processing depending on the print request command (the print data) that is supplied from the communication control portion 21 via the command/data line 26.

The electric source (100 to 240V) is supplied to the Sub electric source 23 and the Main source 24.

Herein, the electric source configuration of the printer device 20 may be a formation of one printer electric source 30 that includes a Sub converter 23A and a Main converter 24A as shown in FIG. 2B, in addition to a configuration that individually includes the Sub electric source 23 driving the communication control portion 21 and the Main electric source 24 driving the print engine 22 as shown in FIG. 2A.

Furthermore, when there is a plurality of print engines, a plurality of Main electric sources/Main converters corresponding to the print engines may be provided, and one Main electric source/Main converter may supply the plurality of print engines with the electric power.

In the printer device 20, configuration example of the Main electric source 24 and the Sub electric source 23 will be described.

Additionally, in the printer device 20 in the printing system 100, when the communication control portion 21 is in the printer standby state while maintaining the USB connection state (USB Ready), the communication control portion 21 cuts off the primary side input electric power of the Main electric source 24, which supplies the print engine 22 with the electric power, by the power relay, by not outputting the print engine Enable signal. When the communication control portion 21 is in the printer standby state while inputting the primary side input electric power of the Main electric source 24, by not outputting the print engine Enable signal, the print engine 22 is in a low electric power consumption state such as the Sleep mode state or the Standby state.

At this time, in a print engine state maintenance RAM 214 within the communication control portion 21, the electric power supply from the Main electric source 24 is shut off or the status information of the print engine 22 of the low electric power consumption state is maintained.

Figure 3A:
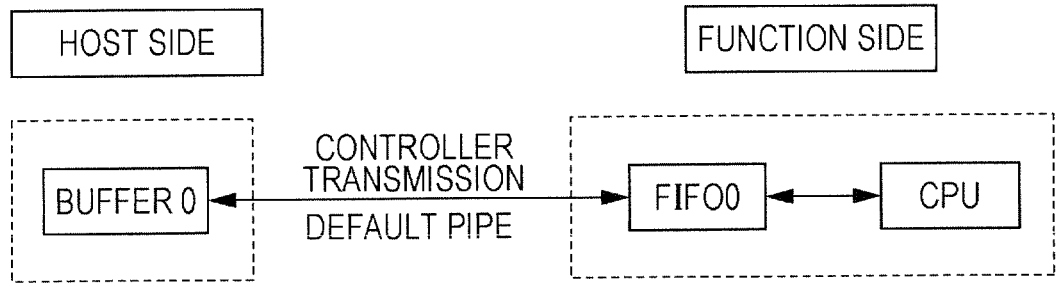
FIGS. 3A and 3B are diagrams that schematically show logical communication concepts in a USB.
Figure 3B:
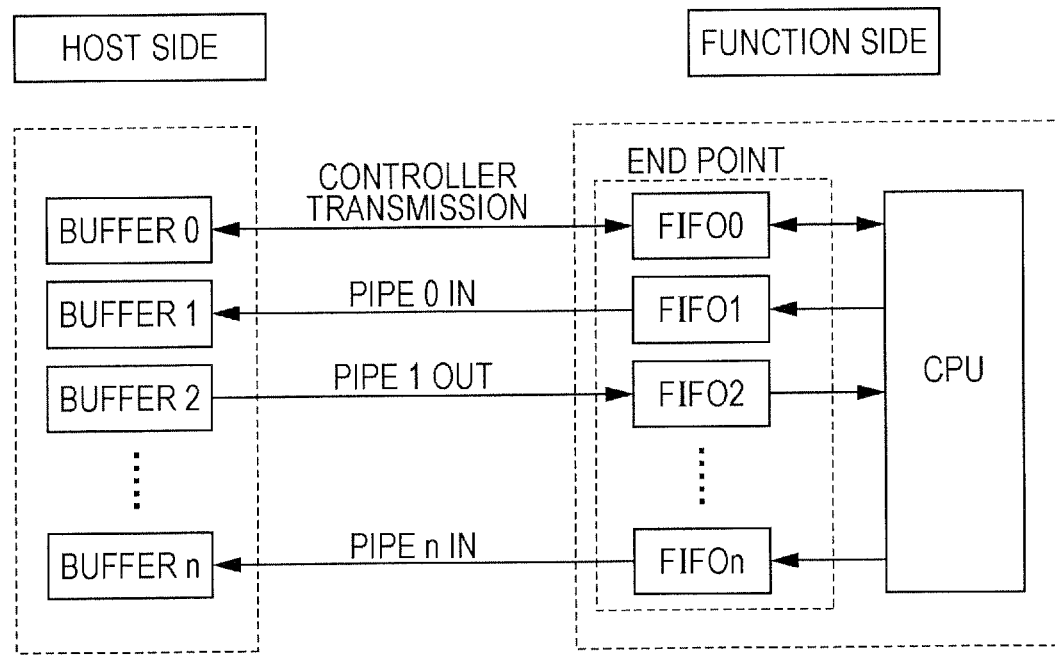

Herein, as shown in FIGS. 3A and 3B, the logical communication in the USB can be expressed by the concept of an end point and a pipe. In the function side, a "FIFO buffer" called an "end point" becomes the actual form of the communication, the same buffer is also provided in the host side, and the buffers are connected to each other by a "pipe", thereby transmitting and receiving the data.

In addition, in the USB system, firstly, as shown in FIG. 3A, the state immediately after the function side is connected to the USB is in before the configuration state and is in the state in which only the control transmission which is the default pipe can be communicated. This state corresponds to an "end point 0 (FIFO 0)". After the configuration is carried out using the control transmission and the using method of the function side is set, as shown in FIG. 3B, in addition to the control transmission, a new end point is added and the pipe is constituted. The pipe can perform only one side direction communication. In the directions of IN/OUT, focusing on the host, the input to the host is defined by IN and the output from the host is defined by OUT. Furthermore, the host can be determined independently from the number of the pipe and the number of the end point.

In a method of the communication of the USB using the pipe, "a bulk transmission", "an interrupt transmission", "an isochronous transmission" or the like are included. In total four transmission methods exist by adding "a control transmission" of the default pipe thereto.

In the printing system 100, between the information processing device 10 and the printer device 20, the control transmission which uses the default pipe that is the logical connection of the USB interface, and the bulk OUT transmission which uses the pipe that is the logical connection established after carrying out the configuration of the USB interface are established.

By the USB interface from the information processing device 10, various commands enter the control transmission end point FIFO buffer 212A, which is included as the storage portion 212 of the communication control portion 21 in the printer device 20, by the control transmission using the default pipe that is the logical connection, and the print request command including the print data enters the bulk OUT transmission end point FIFO buffer 212B by the bulk OUT transmission using the pipe that is the logical connection.

The communication control CPU 215 in the communication control portion 21 responds to and deals with the various commands using the control transmission from the information processing device 10 to the printer device 20. In regard to the status query command or the like from the information processing device 10, the communication control CPU 215 responds to the information processing device 10 without starting up the print engine 22 and without querying the print engine 22.

When the information processing device 10 transmits the print engine start up command using the control transmission, the communication control CPU 215 in the communication control portion 21 outputs the print engine Enable signal to the Main electric source 24 supplying the print engine 22 with the electric power and the print engine 22, and supplies the electric source to the print engine 22 which is in the electric source OFF state or in the low electric power consumption state, thereby starting up the print engine 22.

Next, when the information processing device 10 transmits the print request command including the print data which uses the bulk OUT transmission, the print request command is supplied from the communication control portion 21 to the print engine 22 as it is. The print engine 22 extracts the included print data from the supplied print request command and performs the print processing.

That is, in the printer device 20 in the printing system 100, between the information processing device 10 and the printer device 20, in the state in which the control transmission using the default pipe which is the logical connection of the USB interface and the bulk OUT transmission using the pipe which is the logical connection established after carrying out the configuration of the USB interface can be established, the communication control portion 21 included in the printer device 20 responds to and deals with the various commands using the control transmission from the information processing device 10 to the printer device 20, the communication control portion 21 does not correspond to the print request command including the print data using the bulk OUT transmission, the print request command is supplied from the communication control portion 21 to the print engine 22 in the original command state without changing the content thereof, the print engine 22 responds to and deals with the print request command, and the print processing is carried out according to the print data in the print request command.

Herein, as a method of supplying the print request command including the print data using the bulk OUT transmission from the communication control portion 21 to the print engine 22, the following two methods (A) and (B) exist.

(A) The processing in which, with respect to the print request command which includes the print data using the bulk OUT transmission, the communication control CPU 215 in the communication control portion 21 sends the print request command in the end point FIFO buffer corresponding to the logical connection pipe to the print engine in the original state of the print request command according to the processing of the firmware, is performed.

(B) The processing, in which print engine 22 directly reads the print request command in the end point FIFO buffer corresponding to the logical connection pipe in the communication control portion 21, thereby reading the same into the print engine 22, is performed.

During the printing standby state in which the electric power of the print engine 22 is cut-off or reduced, in a case where the command requesting the status information of the print engine 22 using the control transmission is sent from the information processing device 10 to the printer device 20, the communication control CPU 215 in the communication control portion 21 responds with respect to the information processing device 10 using the similar control transmission, based on the status information of the print engine maintained in the print engine state maintenance RAM 214 in the communication control portion 21, without starting up the print engine 22 and without querying the print engine 22.

As in the printer device 20 in the printing system 100, the communication control portion 21 included in the printer device 20 receives and responds to the control transmission, and the print engine 22 receives and responds to the bulk OUT transmission passing through the communication control portion 21. That is, in the printer device of the related art, since the standby CPU controls the USB interface during standby, the main CPU controls the USB interface at the time of printing, in place during standby CPU, so that the main CPU controls both the print operation and USB interface at the time of printing, the corresponding response to the control transmission in the process of printing is difficult. On the contrary to this, in the printer device 20 in the printing system 100, the print request command is supplied from the communication control portion 21 to the print engine 22 as it is. Thus, the communication control portion 21 can rapidly perform the dealing response to the control transmission even in the process of printing operation and can reduce the standby electric power consumption of the printer device 20 during standby while maintaining the interface between the communication control portion 21 and the information processing device 10 in the efficient state.

As in a printing system 100A described later, the printing system 100 can have a configuration in which the control CPU 225 of the print engine 22 directly reads the print request command from the bulk OUT transmission end point FIFO buffer 212B included in the storage portion 212 of the printer device 20, or, as in a printing system 100B, the printing system 100 can perform the processing in which the communication control CPU 215 in the communication control portion 21 reads the print request command from the bulk OUT transmission end point FIFO buffer 212B included in the storage portion 212 and sends the print request command to the engine as it is according to the processing of the firmware.

Furthermore, in the printing system 100 having such a configuration, as in the printing system 100A described later, a plurality of electric power reduction methods of reducing the electric power of the print engine 22 corresponding to a necessary plurality of restriction values of the standby electric power consumption is mounted on the printer device 20, thereby offering a plurality of electric power reduction methods mounted on the printer device 20, the selection of the electric power reduction method corresponding to the restriction value of the standby electric power consumption depending on conditions of the environment, where the printer device 20 is used, is received from the plurality of electric power reduction methods, and the printer standby state, in which the electric power of the print engine 22 is reduced while maintaining the communication function of the communication control portion 21 is set, by the electric power reduction method selected from the plurality of electric power reduction methods, whereby, the level, in which the electric power of the print engine 22 of the printer device 20 is cut off or reduced, can be selected and set. Thus, the printing system 100 is suitable for various standby electric power consumption restrictions that differ for each country and region and can obtain an excellent user operability, whereby it is possible to reduce the standby electric power consumption of the printer device to the extent that each country restriction and various restrictions can be satisfied while maintaining the interface between the printing system 100 and the information processing device 10 in the effective state.

Furthermore, in the printing system 100 having such a configuration, as in a printing system 100C and a printing system D described later, a plurality of print engines 22 can be attached to and detached from the one communication control portion 21 of the printer device 20, in the printer standby state in which the electric power of the a plurality of print engines 22 is reduced while maintaining the communication function of the communication control portion 21, the communication control portion 21 responds to and deals with the command using the control transmission from the information processing device 10 to the printer device 20, with respect to the start up command of the print operation from the information processing device 10 to the printer device 20, the communication control portion 21 selects the print engine among the plurality of print engines 22 according to the start up command of the received print operation and controls the selected print engine from the printer standby state to a printable state by the return processing, with respect to the print request command including the print data using the bulk OUT transmission from the information processing device 10 to the printer device 20, the print request command is supplied from the communication control portion 21 to the selected print engine in the original command state without changing the content thereof, the selected print engine responds to and deals with the print request command, and the print processing is carried out according to the print data in the print request command, whereby, regardless of the standby state and the normal state, the communication control portion 21 of the printer device 20 responds to and deals with the command of the control transmission, the print engine deals with the command of the bulk OUT transmission, whereby each CPU can effectively perform the distribution processing, it is possible to respond to and deal with the command of the control transmission even in the process of printing processing, the standby electric power consumption of the printer device 20 can be reduced to the extent that various restrictions of each country can be satisfied while maintaining the interface between the printer device 20 and the information processing device 10 in the efficient state.

In addition, similarly to a printing system 100D described later, the printing system 100 can have a configuration that includes a plurality of single function printers having their own USB interface as a plurality of print engines.

2. Explanation of First Detailed Example of Configuration of Printer Device

Next, a first detailed example of a configuration of a printer device in a printing system according to the present invention will be described with reference to FIG. 4.

Figure 4:
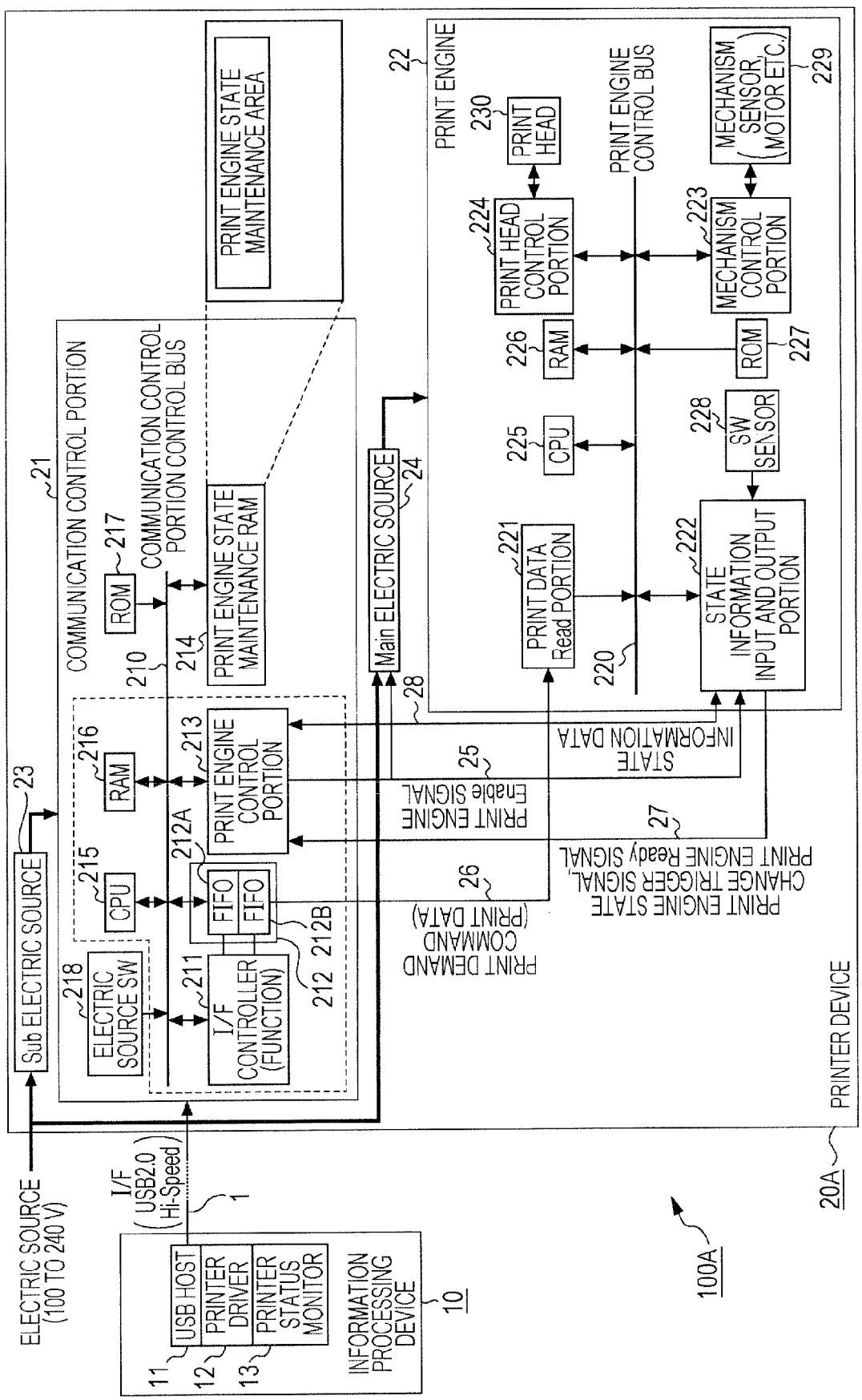
FIG. 4 is a block diagram showing another configuration example of a printing system to which the present invention has been applied.

A printer device 20A in a printing system 100A shown in FIG. 4 is a detailed example of a specific configuration of the printer device 20 in the printing system 100 shown in FIG. 1, and, particularly, is an example in which a control CPU 225 of the print engine 22 directly reads the print request command from a bulk OUT transmission end point FIFO buffer 212B included in a storage portion 212 of the printer device 20.

In addition, in the printing system 100A shown in FIG. 4, the same constituents as those of the printing system 100 shown in FIG. 1 will be denoted by the identical reference numerals and the detailed description thereof will be omitted.

The printer device 20A in the printing system 100A includes a communication control portion 21, a print engine 22, a Sub electric source 23, and a Main electric source 24.

The communication control portion 21 includes a USB 2.0 function I/F controller 211, a storage portion 212, a print engine control portion 213, a print engine state maintenance RAM 214, a communication control CPU 215, a RAM 216, a ROM 217, an electric source switch 218 or the like that are connected to each other via a communication control portion control bus 210.

Furthermore, the printer device 20A includes a control transmission end point FIFO buffer 212A for the control transmission and a bulk OUT transmission end point FIFO buffer 212B for the bulk OUT transmission as the storage portion 212 within the communication control portion 21. The communication control CPU 215 in the communication control portion 21 can be accessed with respect to the control transmission end point FIFO buffer 212A, and the control CPU 225 in the print engine 22 can be accessed with respect to the bulk OUT transmission end point FIFO buffer 212B.

The printer device 20A supplies the print engine 22 with the print request command (the print data) from the storage portion 212 via the command/data line 26. Furthermore, the print engine control portion 213 outputs the print engine Enable signal via the signal line 25 and performs the change of the status information between it and the status information input and output portion 222 of the print engine 22 via the data line 28.

Furthermore, the print engine 22 in the printer device 20A includes a print data Read portion 221, a status information input and output portion 222, a mechanisms control portion 223, a print head control portion 224, a control CPU 225, a RAM 226, a ROM 227, a switch sensor 228 connected to the status information input and output portion 222, a mechanism portion 229 controlled by the mechanism control portion 223, a print head 230 controlled by the print head control portion 224 or the like that are connected to each other via a print engine control bus 220.

In the printer device 20A, upon starting up the print operation, firstly, the print engine electric power control request command (the electric power start up command) using the control transmission is sent from the information processing device 10 to the printer device 20A. The communication control CPU 215 in the communication control portion 21 reads the print engine electric power control request command (the electric power start up command) received from the control transmission end point FIFO buffer 212A and outputs the print engine Enable signal from the print engine control portion 213 to the Main electric source 24 and the print engine 22 via the signal line 25. In addition, at the time of electric power shut-OFF state, the Main electric source 24 performs the processing of inputting the electric source to start the print engine 22, and the print engine 22 is shifted to the normal mode when it is in the low electric power consumption mode.

When the print request command including the print data using the bulk OUT transmission is sent from the information processing device 10 to the printer device 20A, the control CPU 225 in the print engine 22 directly reads the print request command from the bulk OUT transmission end point FIFO buffer 212B of the storage portion 212 in the communication control portion 21 via the command/data line 26 by the print data Read portion 221. Furthermore, the print engine 22 deals with the print data contained in the print request command within the print engine 22 depending on the read print request command, thereby performing the print operation.

Herein, before the start up (the inputting of the electric source, initial operations of the control CPU 225 and a peripheral circuit in the print engine 22, and an initial operation of the mechanism portion 229 in the print engine 22) of the print engine 22 is completed, that is, in a state in which the electric power is not yet supplied to the print engine 22 or the electric power is supplied to the print engine 22 but the control CPU 225 and the peripheral circuit in the print engine 22 are not yet woken or the initial operation of the mechanism portion 229 in the print engine 22 is not completed, in a case where the information processing device 10 sends the print request command including the print data, the communication control portion 21 performs the following processing (1) or (2).

(1) The reception refusal of the print request command is performed.

(2) A part of the print request command is received by an FIFO empty area of the storage portion 212 in the communication control portion 21, and after the FIFO is filled, the reception refusal processing of the residual print request command is performed.

Moreover, the print engine 22 sends the print engine Ready signal, which shows the completion of the start up of the print engine 22 (the input of the electric source, the initial operations of the control CPU 225 and the peripheral circuit in the print engine 22, and the initial operation of the mechanism portion 229 in the print engine 22), from the status information input and output portion 222 to the communication control portion 21 via the signal line 27.

In a case where the information processing device 10 sends the print request command including the print data, when the communication control portion 21 does not receive the print engine Ready state from the status information input and output portion 222 of the print engine 22 (when the print engine 22 is not yet completely woken), the communication control portion 21 performs the following processing (1) or (2).

(1) The reception refusal of the print request command is performed.

(2) A part of the print request command is received by a FIFO empty area of the storage portion 212 in the communication control portion 21, and after the FIFO (RAM) is filled, the reception refusal processing of the residual print request command is performed.

As a method of showing the Ready state of the print engine 22, the print engine Ready signal from the print engine 22 to the communication control portion 21 or the command from the print engine 22 to the communication control portion 21 can be used.

Furthermore, in the printer device 20A, at the time of the printer standby state when the electric power of the print engine 22 is cut off or reduced, in a case where the status information request command of the print engine 22 using the control transmission is sent from the information processing device 10 to the printer device 20A, the communication control CPU 215 in the communication control portion 21 similarly replies to the information processing device 10 using the control transmission based on the status information in the print engine state maintenance area maintained in the print engine state maintenance RAM 214 within the communication control portion 21, without starting up the print engine 22 by the communication control portion 21 and without querying the print engine 22.

While the input electric power of the print engine 22 is shut off or while the print engine 22 is in a low electric power consumption mode, when the state in the print engine 22 is changed, the print engine state change trigger signal is output from the status information input and output portion 222 of the print engine 22 to the communication control portion 21 via the signal line 27. At this time, since the print engine 22 itself is not in the normal operation state, it is difficult to use the active electric signal or the command as the print engine state change trigger signal, but the passive state change can be performed to use the active electric signal as the print engine state change trigger signal. As an example, by shorting the signal pulled up by the communication control portion 21 to the GND in the print engine 22, the information can be transmitted from the print engine 22 to the communication control portion 21.

When the print engine state change trigger signal is output from the status information input and output portion 222 of the print engine 22 to the communication control portion 21 via the signal line 27, based on the print engine state change trigger signal, the communication control portion 21 starts up the electric power supply to the print engine 22 by setting the Main electric source 24 to the print engine 21 to be ON and starts up the control CPU 225 and the peripheral circuit in the print engine 22, whereby the control CPU 225 in the print engine 22 recognizes the changed state in the print engine 22 and the change information is sent from the status information input and output portion 222 of the print engine 22 to the print engine control portion 213 of the communication control portion 21 via the data line 28 as the status information of the print engine. The communication control portion 21 may renew the status information of the print engine state maintenance area in the print engine state maintenance RAM 214.

As an example of the print engine state change trigger signal that is detected by the switch sensor 228 connected to the status information input and output portion 222, there is a creation of an electrical change by a switch or the like upon opening a cover of a recording paper mounting portion in the print engine 22 in a case where a user changes a recording paper in the print engine 22 or the like.

In a case where the print engine state change trigger can deal with a particular state change in the print engine 22, when the print engine state change trigger signal is output from the print engine 22 to the communication control portion 21, the communication control portion 21 can specify the change information in the print engine 22 without starting up the print engine 22, whereby it is possible to renew the corresponding status information of the print engine state maintenance area of the print engine state maintenance RAM 214 in the communication control portion 21.

As the standby state of the printer device 20A, there is a method of shutting off the electric power of the print engine 22. Separately from this method, not by shutting off the electric power to the print engine 22 but by setting the Main electric source 24 to be ON constantly, the electric power is permanently supplied to the print engine, whereby the control CPU 225 and the peripheral circuit in the print engine 22 may be shifted to a low electric power consumption state (the Sleep mode state, the Standby state or the operation clock reduction state of the CPU).

When the state of the print engine 22 is changed at the time of the low electric power consumption state, the print engine 22 is personally changed from the low electric power consumption state to the start up state, thereby the status information of the print engine 22 is sent to the communication control portion 21. The communication control portion 21 can renew the corresponding status information of the print engine state maintenance area in the print engine state maintenance RAM 214.

In this manner, the communication control CPU 215 and the peripheral circuit in the communication control portion 21 respond to the command using the control transmission of the USB interface and the control CPU 225 and the peripheral circuit in the print engine 22 passing through the communication control portion 21 by responding to the print command using the bulk OUT transmission of the USB interface, whereby it is possible to clearly distinguish the role sharing between the communication control CPU 215 in the communication control portion 21 and the control CPU 225 in the print engine.

In a case where the information processing device 10 sends the print request to the printer device 20A during the standby state of the printer device 20A, the communication control CPU 215 in the communication control portion 21 makes a determination based on the status information of the print engine state maintenance area in the print engine state maintenance RAM 214 and performs the following processing (1) or (2).

(1) When the print operation can ordinarily be performed with respect to the print request, the electric source of the print engine 22 is started up and the print processing is performed by the print engine 22.

(2) When it is not possible to ordinarily perform the print operation with respect to the print request, the electric source of the print engine 22 is not started up, but the error information is sent from the communication control portion 21 to the information processing device 10 using the control transmission of the USB interface. The printer driver 11 or the printer status monitor 12 of the information processing device 10 displays the error information on a display portion of the information processing device 10 based on the received error information.

As a method of cutting off or reducing the electric power of the print engine 22, a plurality of methods can be selected from the following methods, and considering the consumption electric power restriction values (the country or the region) of the necessary standby and the user operability (for example, a first print time), a suitable method may be set. The print engine Enable signal output from the communication control portion 21 controls the Main electric source 24, and the control CPU 225 and the peripheral circuit in the print engine 22.

Thus, in the printing system 100A, a plurality of electric power reduction methods of reducing the electric power of the print engine 22 corresponding to the restriction values of a plurality of requested standby electric power consumption is mounted on the printer device 20A, the plurality of electric power reduction methods mounted on the printer device 20A is suggested, from the plurality of electric power reduction methods, the electric power reduction method corresponding to the restriction value during standby electric power consumption depending on the conditions of the environment, where the printer device 20A is used, is received, and, by the electric power reduction method selected from the plurality of electric power reduction methods, the printer standby state, in which the electric power of the printer device 22 is reduced while maintaining the communication function of the communication control portion 21, is set. In this manner, the level, by which the electric power of the print engine 22 of the printer device 20A is cut off or reduced, can be set, whereby the printing system 100A is suitable for various standby electric power consumption restrictions that differ for each country or region and a satisfactory user operability can be obtained, so that the standby electric power consumption of the printer device can be reduced to the extent that restrictions of each country and various other restrictions can be satisfied while maintaining the interface between the printing system 100A and the information processing device 10 in the efficient state.

As an example of the electric power consumption restriction during standby, there are EuP command LOT 4/LOT 6 or international energy star program Ver 1.1.

Herein, the first print time is a time from after the print command is issued from the information processing device to the printer device to when the print operation is actually started up by the print engine.

When the electric source to the print engine 22 is not performed, the first print time is taken in some case. It is affected by the internal structure of the printer device, the print method of the print head, the CPU start up time of the print engine or the like.

In this manner, when a plurality of kinds of the necessary standby electric power consumption restrictions exist, the methods of cutting off or reducing the electric power of the plurality of print engines to correspond to the plurality of restrictions are included, a suitable method can be selected among the methods of cutting or reducing the electric power of the plurality of print engines can be selected so as to be suitable for the conditions of the environment (e.g., the nation, the region etc.) where the printer device is used. Furthermore, when the selected method is registered as an initial value of the printer device, it serves as the standby consumption electric power reduction mode corresponding to the restriction in the country, the region or the like at the time of start up of the printer device after the next time and is preferable.

In a case where the method of cutting off or reducing the electric power of the plurality of print engines and the operability of the printer device have the properties that are contrary to each other, a method of cutting off or reducing the electric power having the best operability of the printer device while meeting the necessary standby electric power consumption restriction may be selected.

Figure 5:
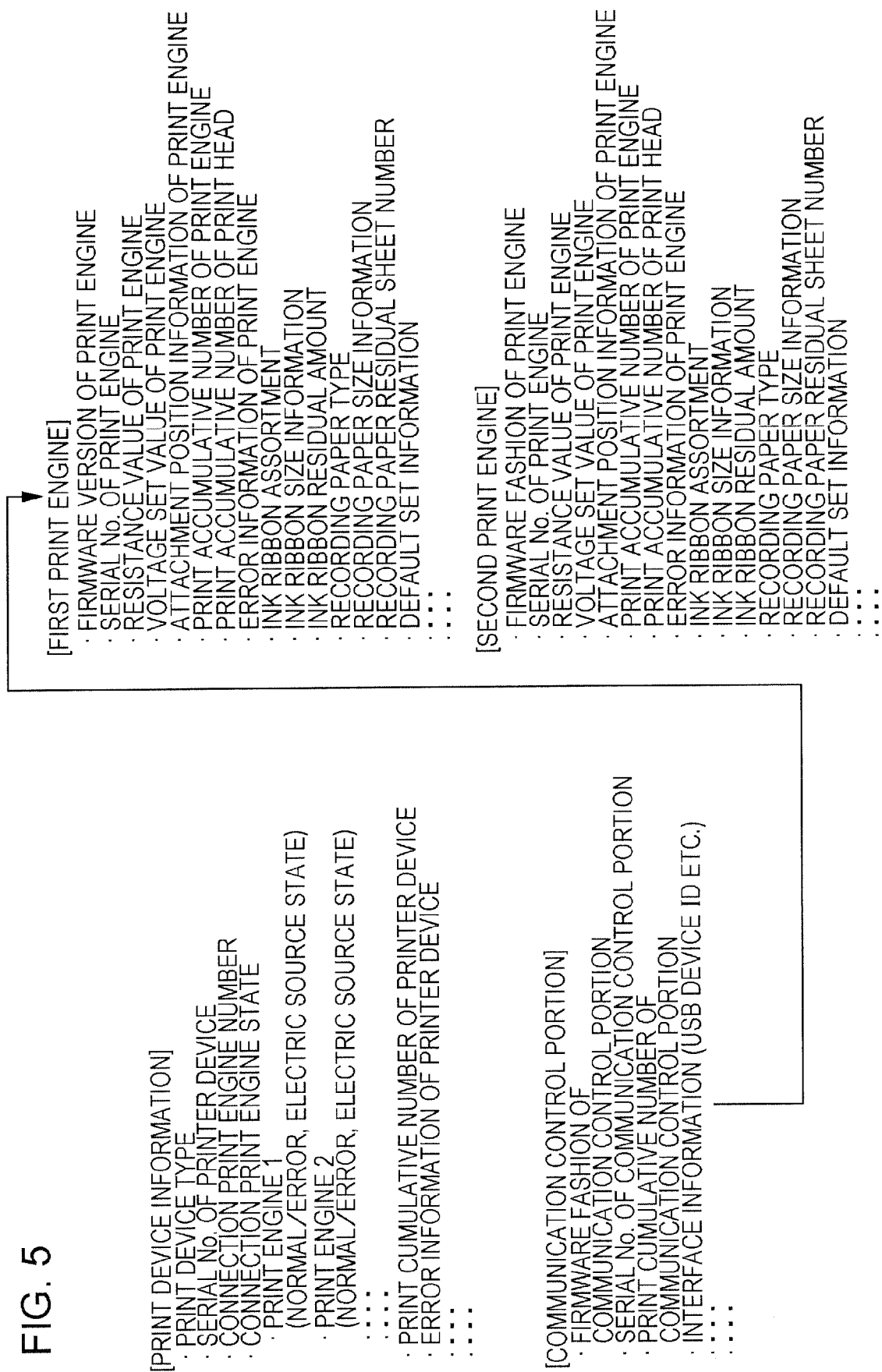
FIG. 5 is a diagram that shows an example of each print engine status information maintained in a print engine state maintenance RAM of the printer device in the printing system.

An example of the status information of each print engine maintained in the print engine state maintenance area of the print engine state maintenance RAM 214 within the communication control portion 21 of the printer device 20A is shown in FIG. 5.

In addition to the state maintenance information corresponding to each print engine, it is desirable to maintain the information of the overall printer device and the communication control portion 21.

The print engine state maintenance RAM 214 is preferably constituted by a nonvolatile memory such as an EEPROM. However, it may be constituted by a volatile memory such as a DRAM or a SRAM. In this case, for each time the communication control portion 21 is woken up, it is necessary to collect the necessary information from each portion of the printer device.

Herein, when the electric source of the control CPU 225 is cut off by setting the electric source supply to the print engine 22 to be OFF, an increase time of the print engine 22 is lengthened. When the control CPU 225 is set in the pause state by setting the electric source supply to the print engine 22 to be ON, the increase time of the print engine 22 becomes the medium, and by setting the electric source supply to the print engine 22 to be ON to set control CPU 225 to the pause state, the increase time of the print engine 22 is shortened. However, it is supposed that the CPU standby state consumes the electric power more than the CPU pause state.

In addition, for example, the electric source supply as in the following (1) to (3) is controlled.

(1) As shown in FIG. 6A, a power relay circuit 29 is provided at the primary side of the Main electric source 24 and the operation of the power relay circuit 29 is controlled by the print engine Enable signal output from the communication control portion 21 via the signal line 25. As a result, the primary side input of the Main electric source 24, which supplies the print engine 22 with the electric power, is cut off by the power relay circuit 29, and the electric power input to the Main electric source 24 is set to 0 W. Thus, the electric sources of the control CPU 225 and the peripheral circuit in the print engine 22 enter the OFF state.

(2) As shown in FIG. 6B, by the print engine Enable signal which is output from the communication control portion 21 via the signal line 25, the oscillation operation of the switching electric source circuit, which constitutes the Main electric source 24 supplying the print engine 22 with the electric power, is stopped. The Main electric source 24 slightly consumes the electric power. Since the output of the Main electric source 24 is set to be Off, the electric source of the control CPU 225 and the peripheral circuit in the print engine 22 is also set to be into the OFF state.

(3) The Main electric source 24 supplying the print engine 22 with the electric power is turned ON to still supply the control CPU 225 and the peripheral circuit in the print engine 22 with the electric power, thereby setting the control CPU 225 to the low electric power consumption state (the Sleep mode state, the Standby state or the Operation clock reduction state of the control CPU 225).

In addition, upon designing the Main electric source/Main converter at a realistic cost, in order to set the standby electric power at less than 0.5 W, it can be empirically judged that it is necessary to physically cut the primary side input with a power relay or the like.

The result of the measured standby electric power when the USB interface is made effectively by a printer test device using the power relay is shown in table 1.

TABLE 1

| Input Voltage | Frequency | Standby Electric Power Consumption |
| --- | --- | --- |
| AC 100 V | 50 Hz | 0.39 W |
|  | 60 Hz | 0.39 W |
| AC 115 V | 50 Hz | 0.39 W |
|  | 60 Hz | 0.39 W |
| AC 230 V | 50 Hz | 0.48 W |
|  | 60 Hz | 0.49 W |
| AC 240 V | 50 Hz | 0.49 W |
|  | 60 Hz | 0.49 W |

Table 1 is an example of the standby electric power measurement value of a case of using a power relay.

In all the results shown in Table 1, the standby electric power of less than 0.50 W is realized. By optimizing the circuit configuration of the printer test device, for example, removing an unnecessary circuit, standby electric power can be further reduced.

Herein, since the short start up time of the print engine 22 results in a rapid start up of the initial printer, the operability of the printer device is excellent.

Figure 7:
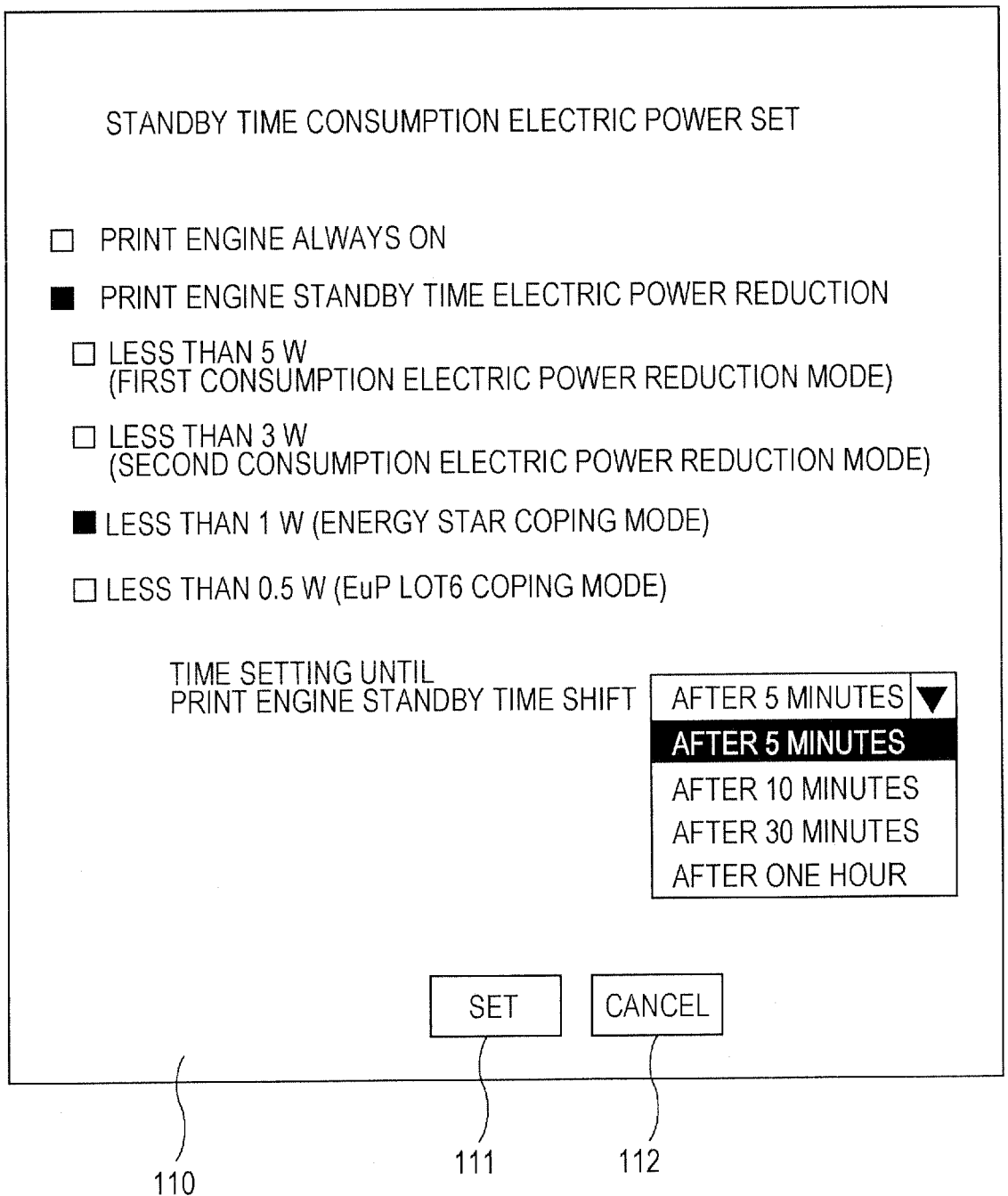
FIG. 7 shows a screen example of a standby electric power consumption setting in the printing system.

Thus, in the printing system 100A including the printer device 20A, the information processing device 10 displays a standby electric power consumption setting screen 110 shown in FIG. 7, and during standby, the selection input for selecting whether the electric source of the print engine 22 is still turned on or the electric power is reduced is received on the standby electric power consumption setting screen 110. In addition, in a case of selecting the setting of the standby electric power reduction of the print engine 22, continuously, the selection input for selecting the electric power value during standby is received on the standby electric power consumption setting screen 110, and the selection input for selecting the time from after the operation completion of the print engine 22 to the standby shift is received on the standby electric power consumption setting screen 110. By the operation of a setting button 111 that is displayed on the standby electric power consumption setting screen 110, the standby electric power consumption setting is performed by the received selection content. Furthermore, the content of the standby electric power consumption setting is cancelled by the operation a cancellation button 112. It is desirable that the default setting of the printer device 20A is set so that the standby electric power consumption setting is set as the minimum and the time setting up to the standby shift is set at the minimum time.

The operation state of the case of selecting each setting is as follows:

In a first electric power consumption reduction mode, the electric power is supplied from the Sub electric source 23 to the communication control portion 21, and the communication control CPU 215 of the communication control portion 21 is operated, thereby controlling the USB interface. Moreover, the Main electric source 24 is supplied with the primary side input electric source, and the electric power is supplied from the Main electric source 24 to the print engine 22. In addition, the control CPU 225 in the print engine 22 is set to the standby mode and in the CPU standby state. Moreover, the control CPU 225 of the standby state is changed from the standby state to the start up state for each certain time or due to the fact that the state change of the print engine 22 occurs, and after performing a necessary processing, the control CPU 225 is shifted to the standby state again. By the electric source control, in the first electric power consumption reduction mode, the electric power consumption is set to be less than 5 W.

Furthermore, in a second electric power consumption reduction mode, the electric power is supplied from the Sub electric source 23 to the communication control portion 21, and the communication control CPU 215 of the communication control portion 21 is operated, thereby controlling the USB interface. Moreover, the primary side input electric source is supplied to the Main electric source 24 and the electric power is supplied from the Main electric source 24 to the print engine 22. Furthermore, the control CPU 225 in the print engine 22 is set to the pause mode and is in the CPU pause state. Additionally, devices or circuits other than the control CPU 225 in the print engine are in the low electric power consumption state. In addition, the electric source of the circuit is partially turned Off. By such an electric source control, in the second electric power consumption reduction mode, the electric power consumption is set to be less than 3 W.

Furthermore, in an ENERGY STAR dealing mode, the electric power is supplied from the Sub electric source 23 to the communication control portion 21, and the communication control CPU 215 of the communication control portion 21 is operated, thereby controlling the USB interface. Furthermore, the primary side input electric source is supplied to the Main electric source 24. In addition, the print engine Enable signal is input to the Main electric source 24 and an oscillation control terminal of a switching electric source circuit constituting the Main electric source 24 is turned Off, thereby making the Main electric source 24 be in an oscillation stop state, whereby the electric power is not supplied from the Main electric source 24 to the print engine 22. The print engine 22 is in the electric source Off state. In addition, when a power relay circuit exists in the primary side input electric source input to the Main electric source 24, the power relay is still in the ON state. By such an electric source control, in the ENERGY STAR dealing mode, the electric power consumption is less than 1 W.

In addition, in a EuP LOT 6 dealing mode, the electric power is supplied from the Sub electric source 23 to the communication control portion 21, and the communication control CPU 215 of the communication control portion 21 is operated, thereby controlling the USB interface. Furthermore, the primary side input electric source, which is input to the Main electric source 24, is cut by the power relay circuit. Furthermore, the electric power supply from the Main electric source 24 to the print engine 22 is shielded. Moreover, the print engine 22 is in the electric source OFF state. By such an electric source control, in the EuP LOT 6 dealing mode, the electric power consumption is less than 0.5 W.

Figure 8:
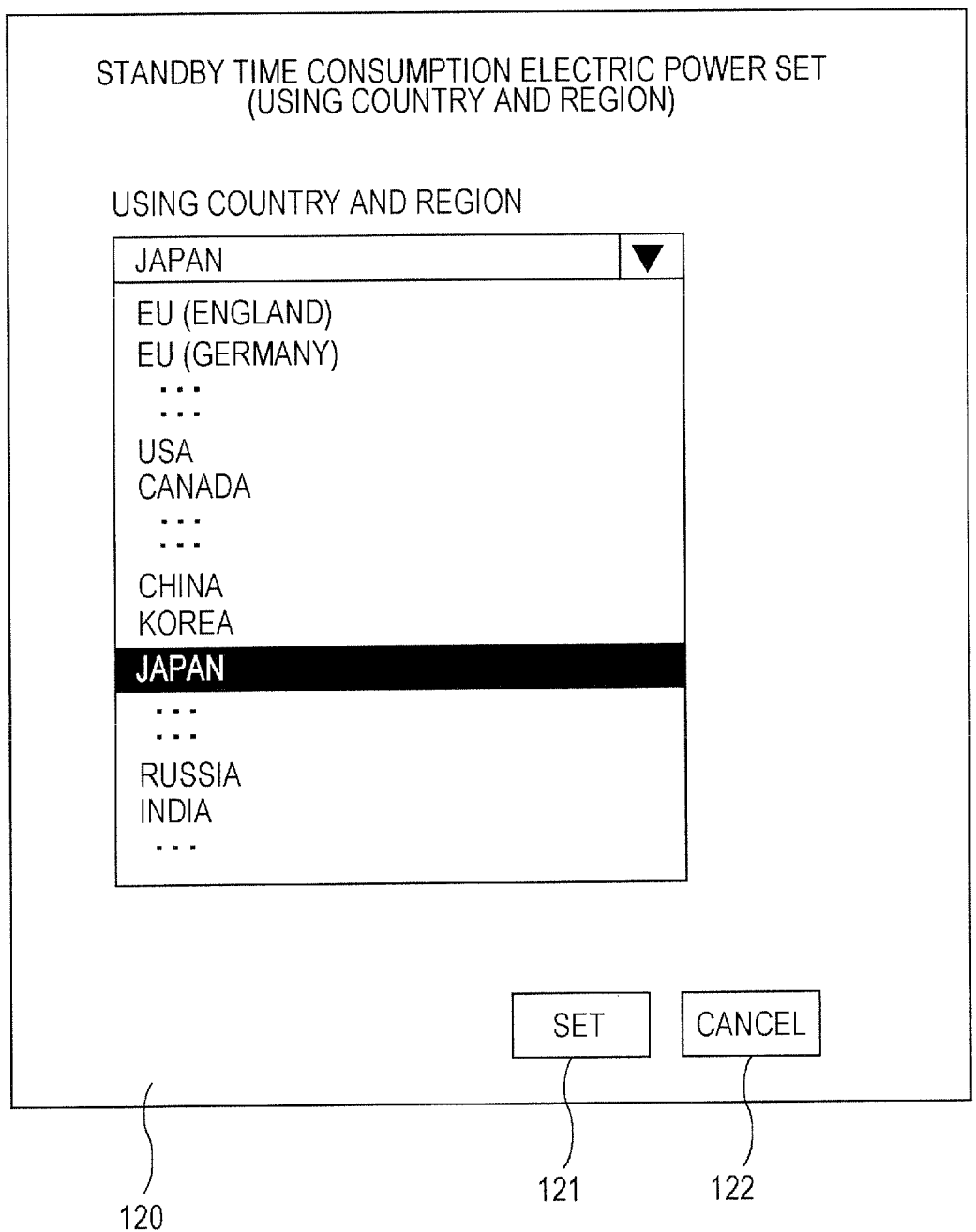
FIG. 8 shows another screen example of a standby electric power consumption setting in the printing system.

Moreover, in the printing system 100A including the printer device 20A, in order to set the most usable operability while obeying the legal regulations of each country, a standby electric power consumption setting screen 120 shown in FIG. 8 is displayed by the information processing device 10, the selection input for selecting the usage country and region is received on the standby electric power consumption setting screen 120, and the selected usage country and region are set by the operation of a setting button 121 that is displayed on the standby electric power consumption setting screen 120, whereby the standby electric power consumption setting suitable for the set country and region is automatically selected. In addition, the setting of the usage country and region is cancelled by the operation of the cancellation button 122.

Furthermore, in the print method of the print engine 22, a sublimation type thermal transfer print type, a dissolution type print type, an ink jet type, and an electronic photograph type can be used.

As a characteristic element that controls the electric power during standby in each print type, there are a preliminary heating control of a thermal head for regularly maintaining the picture quality in the sublimation type thermal transfer print type, a preliminary heating control of a thermal head for regularly maintaining the picture equality in the dissolution type print type, a preliminary heating control of the ink jet head and the ink for regularly maintaining the viscosity of the ink in the ink jet type, a heat roller control of a fixing portion in the electronic photograph type or the like.

Herein, at the time of electric source input of the overall printer device 20A, an initial operation processing of the mechanism portion 229 in the printer device 20A is carried out, and when the electric power of the print engine 22 is started up from the print standby state, the initial operation processing of the mechanism portion 229 controlled by the mechanism control portion 223 in the printer device 20A may not be carried out.

Furthermore, the printer device 20A includes a printer installation status change detection sensor as the switch sensor 228. The printer installation status change detection sensor detects whether or not the installation status of the printer device 20A is changed at the time of electric power cut-off or reduction of the print engine 22. In a case where there is a change, even when the electric power of the print engine 22 is started up from the printer standby state, the initial operation processing of the mechanism portion 229 controlled by the mechanism control portion 223 in the printer device 20A is carried out.

Even in a print engine 22 which necessitates an initial powering on as the operation of the mechanism portion 229, when there is no physical change (the movement of the installation place, the change of the recording paper, the change of the ink ribbon, opening and closing of the set or the like) completely after the prior print operation, the power on initial operation of the mechanical portion becomes unnecessary in some cases. As the printer installation status change sensor, a powerless sensor, and a sensor controlled by the communication control portion 21, in which the electric source is input, may be used. As the printer installation status change detection sensor, as an example, there is a gyro sensor or an acceleration sensor.

Moreover, the printer device 20A includes a communication control portion 21, a print engine 22, and each electric source 23 and 24, and the print engine 22 may be attached and detached. By enabling the print engine 22 to be attached and detached, the print engines 22 of the different types may be changed and mounted. For example, the print engine of an A6 size and the print engine of an A4 size may be selected and changed. For example, a monochrome print engine and a color print engine may be selected and changed.

Furthermore, in order to renew each set of status information of the print engine state maintenance area in the print engine state maintenance RAM 214, any one method of the following methods (1) to (5) may be adopted.

(1) At the start up time of the overall printer device 20A, the print engine 22 is started up and the status information corresponding to the print engine is renewed.

(2) When the print engine 22 is attached and detached, the status information of the print engine is renewed.

(3) When the state of the print engine 22 is changed, the print engine state change trigger signal is output from each print engine to the communication control portion 21, the communication control portion 21 starts up the corresponding print engine, the status information is sent from the started up print engine to the communication control portion 21, and each set of status information of the print engine state maintenance area is renewed.

(4) When the state of the print engine 22 is changed, in a case where the control CPU of the print engine can be started up, the status information is sent from the started up print engine to the communication control portion 21, and each set of status information of the print engine state maintenance area is renewed.

(5) When it becomes the date and time for each fixed time/preliminarily scheduled, each print engine is started up and the status information is renewed.

As in the printing system 100A, a plurality of print engines 22 can be attached to and detached from one communication control portion 21 of the printer device 20A, in a printer standby state in which the electric power of a plurality of print engines 22 is reduced while maintaining the communication function of the communication control portion 21, the communication control portion 21 responds to and deals with the command using the control transmission from the external equipment to the printer device 20A, with respect to the start up command of the print operation from the external equipment to the printer device 20A, the communication control portion 21 selects the print engine among the plurality of print engines 22 according to the start up command of the received print operation, the selected print engine is controlled from the printer standby state to the printable state by the return processing, with respect to the print request command including the print data using the bulk OUT transmission from the external equipment to the printer device 20A, the print request command is supplied from the communication control portion 21 to the selected print engine in the original command state without changing the content thereof, the selected print engine responds to and deals with the print request command, and the print processing is carried out according to the print data in the print request command, whereby, regardless of the standby state and the normal state, the communication control portion 21 of the printer device 20A responds to and deals with the command of the control transmission, the print engine deals with the command of the bulk OUT transmission, whereby each CPU can effectively perform the distribution processing, it is possible to respond to and deal with the command of the control transmission even in the process of printing processing, the standby electric power consumption of the printer device 20A can be reduced to the extent that each country and various restrictions can be satisfied while maintaining the interface between the printer device 20A and the external equipment in the efficient state.

3. Explanation of Second Detailed Example of Configuration of Printer Device

Next, a second detailed example of a configuration of a printer device in a printing system according to the present invention will be described with reference to FIG. 9.

Figure 9:
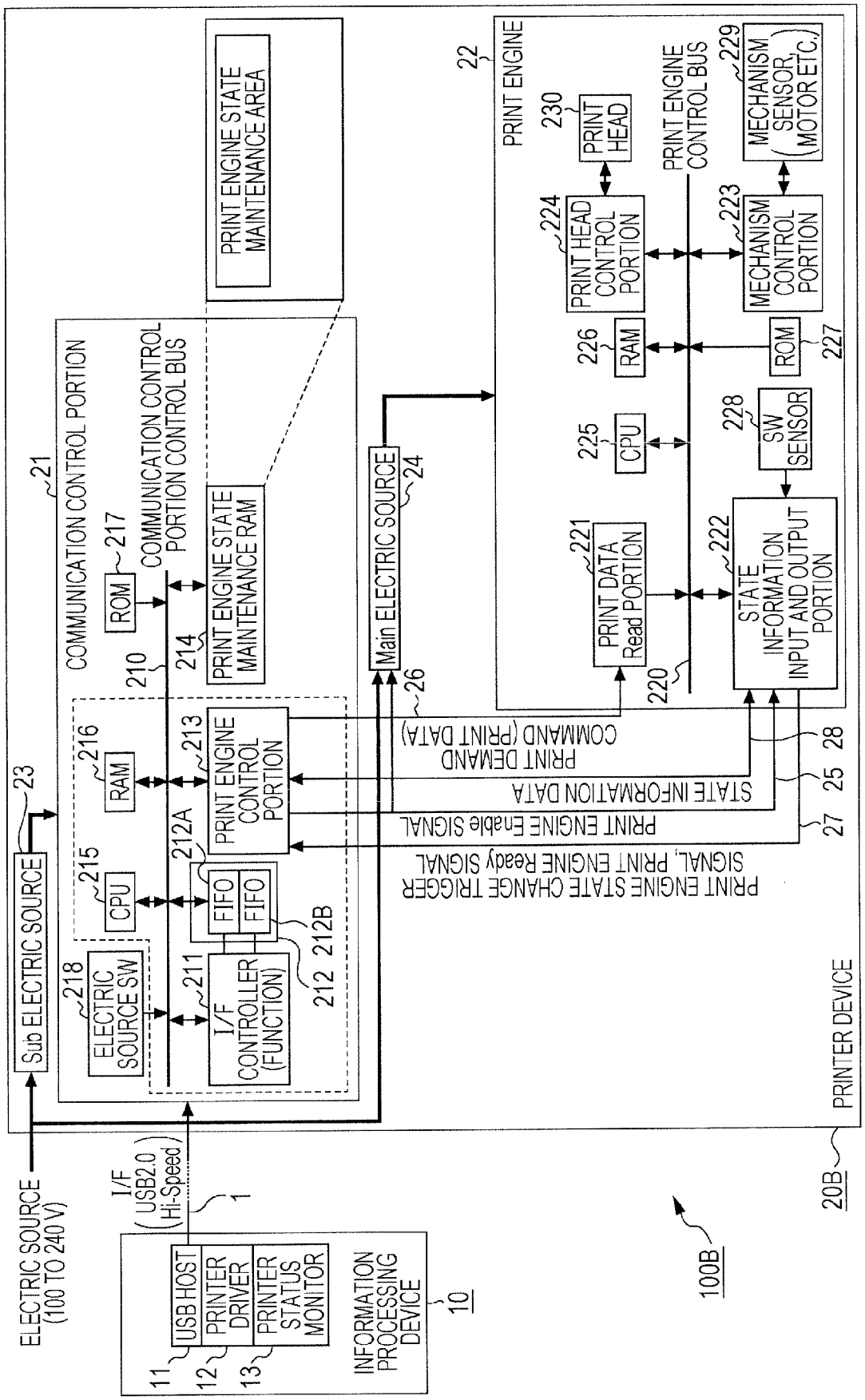
FIG. 9 is a block diagram showing another configuration example of a printing system to which the present invention has been applied.

A printing system 100B shown in FIG. 9 is a detailed example of a specific configuration of the printer device 20 in the printing system 100 shown in FIG. 1, and, particularly, is configured so that a communication control CPU 215 of the communication control portion 21 sends the print request command from a bulk OUT transmission end point FIFO buffer 212B included in the storage portion 212 to the print engine 22.

In addition, in the printing system 100B shown in FIG. 9, the same constituent parts as the printer device 20A of the printing system 100A shown in FIG. 4 will be denoted by the identical reference numerals and the detailed description thereof will be omitted.

The printer device 20B in the printing system 100B includes the communication control portion 21, the print engine 22, the Sub electric source 23, and the Main electric source 24.

The communication control portion 21 includes a USB 2.0 function I/F controller 211, a storage portion 212, a print engine control portion 213, a print engine state maintenance RAM 214, a communication control CPU 215, a RAM 216, a ROM 217, an electric source switch 218 or the like that are connected to each other via the communication control portion control bus 210.

Furthermore, in the printer device 20B in the printing system 100B, similarly to the printer device 20A in the printing system 100A, the print engine 22 does not directly read the print request command in the bulk OUT transmission end point FIFO buffer 212B of the storage portion 212 of the communication control portion 21, the communication control CPU 215 in the communication control portion 21 can be accessed to the bulk OUT transmission end point FIFO buffer 212B of the storage portion 212, and the communication control CPU 215 firstly reads the print request command, thereby outputting the print request command from the print engine control portion 213 to the print engine 22 via the command/data line 26 as it is.

In the printer device 20B, since the communication control CPU 215 in the communication control portion 21 does not have to determine and respond to the content of the print request command, the processing time taken in the determination and the response can be reduced.

4. Explanation of Print Operation in Printing System

Next, the print operations in the printing systems 100, 100A and 100B will be described with reference to a flow chart shown in FIGS. 10A and 10B.

Figure 10A:
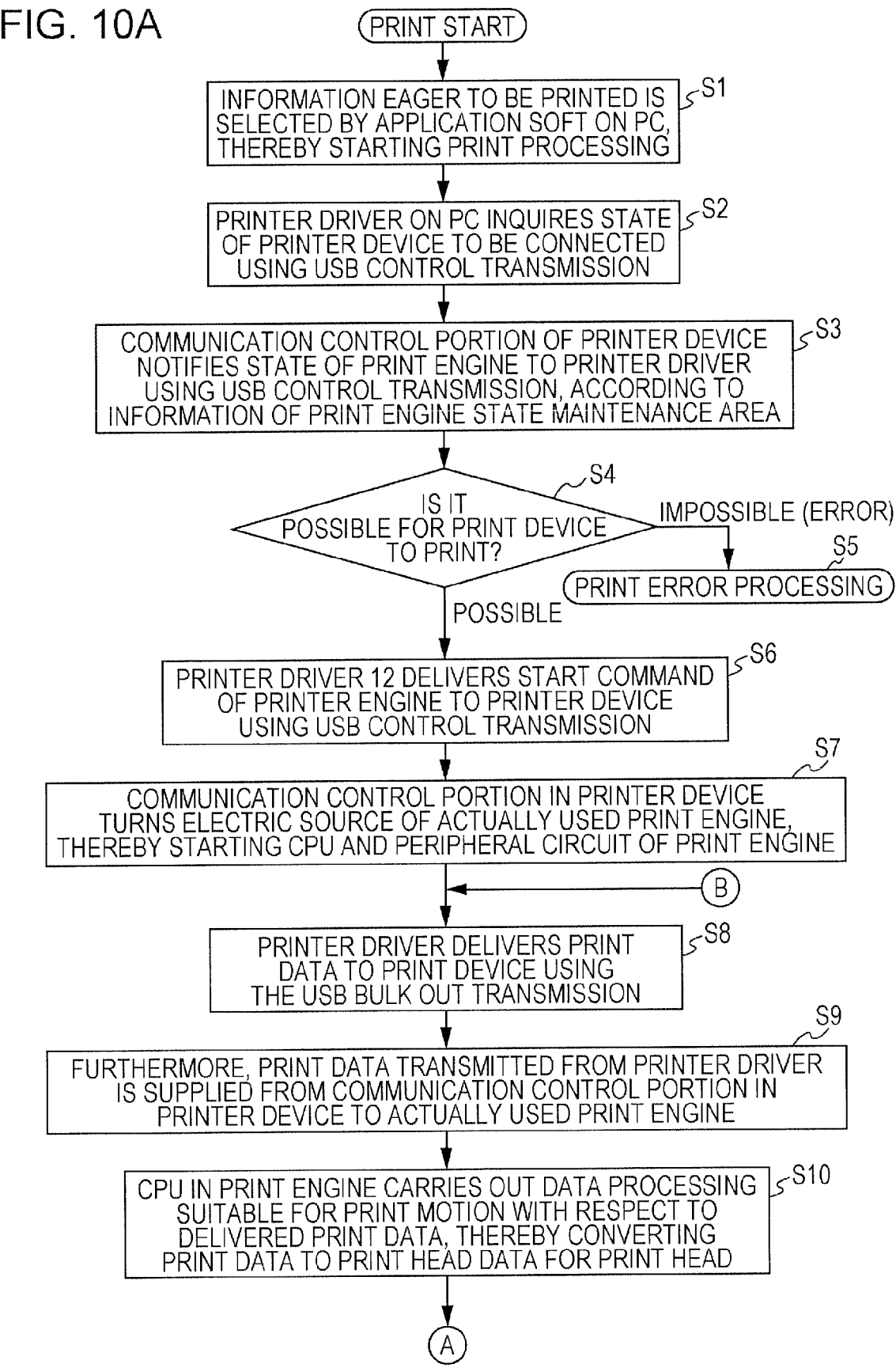
FIGS. 10A and 10B are flow chart showing the order of print operation in the printing system.
Figure 10B:
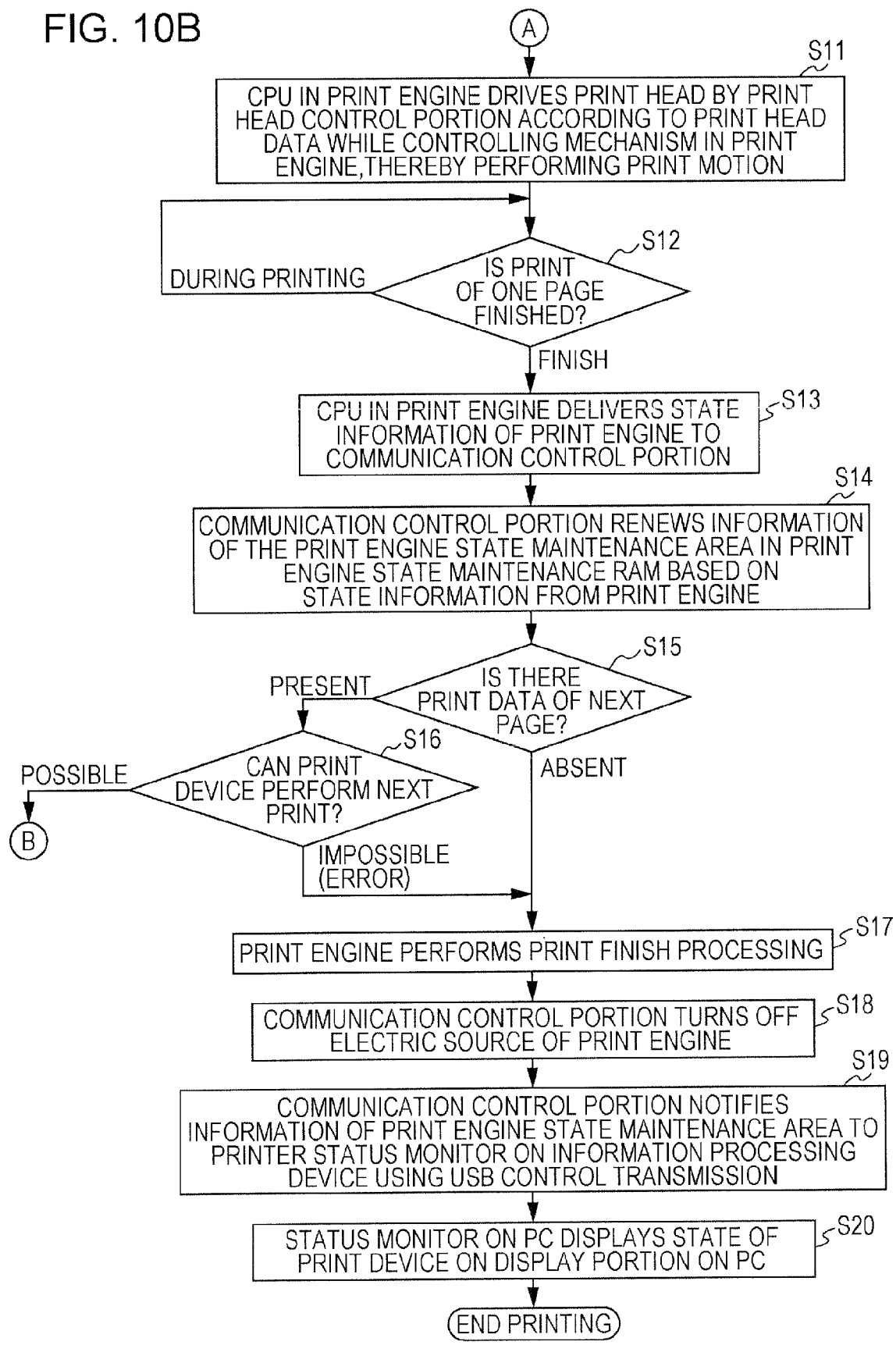

Herein, the flow chart of FIGS. 10A and 10B shows the print operations of the printer devices 20, 20A and 20B of a case where the print engine is one and the USB interface is used in the printing systems 100, 100A, and 100B.

That is, in the printing systems 100, 100A and 100B, the information waiting to be printed is selected by a piece of application software on the information processing device 10, whereby the print processing is started up (step S1).

When the print processing is started up, the printer driver 12 on the information processing device 10 queries the state of the printer device 20 to be connected using the USB control transmission (step S2).

The communication control portion 21 of the printer device 20 relays the print engine 22 state to the printer driver 12 using the USB control transmission, according to the status information maintained in the print engine state maintenance area of the print engine state maintenance RAM 214, depending on the query from the printer driver 12 (step S3).

Next, the printer driver 12 on the information processing device 10 determines whether or not the printer device 20 can print based on the status information known from the communication control portion 21 (step S4).

Moreover, if the determination result in step S4 is "not possible", the printer driver 12 on the information processing device 10 performs the print error processing (step S5).

Furthermore, of the determination result in step S4 is "possible", the printer driver 12 on the information processing device 10 sends the start up command of the print engine 22 to the printer device 20 using the USB control transmission (step S6).

When the start up command of the print engine 22 is transmitted from the printer driver 12 on the information processing device 10, the communication control portion 21 in the printer device 20 outputs the print engine Enable signal and turns the Main electric source 24 of the actually used print engine 220N, thereby starting up the control CPU 225 and the peripheral circuit of the print engine 22, and the mechanism portion 229 (step S7).

Next, the printer driver 12 on the information processing device 10 sends the print data to the printer device 20 using the USB bulk OUT transmission (step S8).

Furthermore, the print data transmitted from the printer driver 12 is supplied from the communication control portion 21 in the printer device 20 to the actually used print engine 22 (step S9).

Herein, in the printer device 20A, in step S9, the control CPU 225 in the print engine 22 directly reads the data in the bulk OUT transmission end point FIFO buffer 212B.

Moreover, in the printer device 20B, in step S9, the communication control CPU 215 in the communication control portion 21 reads the data in the bulk OUT transmission end point FIFO buffer 212B and sends the data to the print engine 22 as it is.

Next, in the printer device 20, the control CPU 225 in the print engine 22 carries out the data processing suitable for the print operation with respect to the sent print data, thereby converting the print data to the print head data for the print head (step S10).

Moreover, in the printer device 20, the control CPU 225 in the print engine 22 drives the print head 230 by the print head control portion 224 according to the print head data while controlling the mechanism portion 229 with the mechanism control portion 223 in the print engine 22, thereby performing the print operation (step S11).

Next, the control CPU 225 in the print engine 22 of the printer device 20 determines whether or not the printing of one page is finished (step S12).

If the determination result in step S12 is "in the process of printing", the control CPU 225 repeatedly performs the determination processing of the step S12.

In addition, if the determination result in step S12 is "finished printing", the control CPU 225 in the print engine 22 of the printer device 20 sends the status information of the print engine 22 to the communication control portion 21 (step S13).

Next, the communication control portion 21 of the printer device 20 renews the information of the print engine state maintenance area in the print engine state maintenance RAM 214 based on the status information from the print engine 22 (step S14).

Next, the control CPU 225 in the print engine 22 of the printer device 20 determines whether or not the print data of the next page is present (step S15).

When the determination result in step S15 is "present", the control CPU 225 in the print engine 22 of the printer device 20 determines whether or not the next print operation is possible based on the status information of the print engine 22 (step S16).

Moreover, when the determination result in step S16 by the control CPU 225 in the print engine 22 of the printer device 20 is "possible", the process is shifted to step S8, the printer driver 12 on the information processing device 10 sends the print data after the next page to the printer device 20 using the USB bulk OUT transmission. By repeating the processing from step S8 to step S16, the printer driver 12 on the information processing device 10 sends the print data of the whole page to the printer device 20. When the printer device 20 can continuously receive the print data using the USB bulk OUT transmission, the printer driver 12 continuously sends the print data of a number of pages.

Moreover, when the determination result in step S15 is "not present", and when the determination result in step S16 is "not possible", the control CPU 225 in the print engine 22 of the printer device 20 performs the print finish processing (step S17).

Next, the communication control portion 21 of the printer device 20 sets the electric source of the print engine 22 to Off (step S18).

Next, the communication control portion 21 of the printer device 20 relays the information of the print engine state maintenance area to the printer status monitor 13 on the information processing device 10 using the USB control transmission (step S19).

Moreover, in the information processing device 10, the printer status monitor 13 displays the state of the printer device 20 on the display portion on the information processing device 10 as necessary (step S20) and finishes the print processing.

5. Explanation of Third Detailed Example of Configuration of Printer Device

Next, a third detailed example of a configuration of a printer device in a printing system according to the present invention will be described with reference to FIG. 11.

A printing system 100C shown in FIG. 11 has a configuration in which a plurality of print engines 22 can be attached to and detached from the one communication control portion 21 and it is possible to obtain the printer standby state of the electric power of the plurality of print engines 22 is cut off or reduced while maintaining the communication function of the communication control portion 21, in the printer device 20B in the printing system 100B shown in FIG. 9.

In the printing system 100C, a case where two print engines 22 are provided is explained, but the number of the print engines may be three or more.

In addition, in the printing system 100C shown in FIG. 11, the same constituent parts as those of the printer device 20B in the printing system 100B shown in FIG. 9 are denoted by the same reference numerals and the detailed description thereof will be omitted.

The printer device 20C in the printing system 100C includes the communication control portion 21, two print engines 22A and 22B, the Sub electric source 23, and two Main electric sources 24A and 24B.

The communication control portion 21 includes a USB 2.0 function I/F controller 211, a storage portion 212, a print engine control portion 213, a print engine state maintenance RAM 214, a communication control CPU 215, a RAM 216, a ROM 217, an electric source switch 218 or the like that are connected to each other via the communication control portion control bus 210.

The communication control portion 21 controls the USB interface (USB 2.0 High-Speed) between it and the information processing device 10. In addition, the communication control portion 21 selects a suitable print engine from among the plurality print engines 22A and 22B according to the start up command of the received print operation and carries out the print processing in the selected print engine. That is, by outputting the first print engine Enable signal via the signal line 25A, the communication control portion 21 performs the electric power control on the first Main electric source 24A and the first print engine 22A. Moreover, the communication control portion 21 sends the print request command (the print data) via the first command/data line 26A with respect to the first print engine 22A, thereby carrying out the print processing in the first print engine 22A. Furthermore, by outputting the second print engine Enable signal via the signal line 25B, the communication control portion 21 performs the electric power control on the second Main electric source 24B and the second print engine 22B. In addition, the communication control portion 21 sends the print request command (the print data) via the second command/data line 26B with respect to the second print engine 22B, thereby carrying out the print processing in the second print engine 22B.

Furthermore, in the print engine state maintenance RAM 214 of the communication control portion 21, a first print engine state maintenance area which maintains the status information of the first print engine 22A, and a second print engine state maintenance area which maintains the status information of the second print engine 22B are provided.

Furthermore, the first print engine 22A in the printer device 20C includes a print data Read portion 221A, a status information input and output portion 222A, a mechanism control portion 223A, a print head control portion 224A, a control CPU 225A, a RAM 226A, a ROM 227A, a switch sensor 228A connected to the status information input and output portion 222A, a mechanism portion 229A controlled by the mechanism control portion 223A, a print head 230A controlled by the print head control portion 224A or the like that are connected to each other via a print engine control bus 220A.

The first Main electric source 24A enters the ON state and the electric source is supplied depending on the first print engine Enable signal that is output from the communication control portion 21 via the signal line 25A, whereby the first print engine 22A is driven. Furthermore, the first print engine 22A carries out the print processing depending on the print request command (the print data) that is sent from the communication control portion 21 via the command/data line 26.

The first print engine 22A transmits and receives the status information between the status information input and output portion 222A and the communication control portion 21 via the data line 28. Furthermore, the first print engine 22A sends the print engine Ready signal showing the completion of the start up (the input of the electric source, the initial operations of the control CPU 225A and the peripheral circuit, and the initial operation of the mechanism portion 229A) of the print engine 22A from the state input and output portion 222A to the communication control portion 21 via the signal line 27A.

Furthermore, the second print engine 22B in the printer device 20C includes a print data Read portion 221B, a status information input and output portion 222B, a mechanism control portion 223B, a print head control portion 224B, a control CPU 225B, a RAM 226B, a ROM 227B, a switch sensor 228B connected to the status information input and output portion 222B, a mechanism portion 229B controlled by the mechanism control portion 223B, a print head 230B controlled by the print head control portion 224B or the like that are connected to each other via a print engine control bus 220B.

The second Main electric source 24B enters the ON state and the electric source is supplied depending on the second print engine Enable signal that is output from the communication control portion 21 via the signal line 25B, whereby the second print engine 22B is driven. Furthermore, the second print engine 22B carries out the print processing depending on the print request command (the print data) that is sent from the communication control portion 21 via the command/data line 26.

The second print engine 22B sends and receives the status information via the data line 28 between the status information input and output portion 222B and the communication control portion 21. Furthermore, the first print engine 22B sends the print engine Ready signal showing that the start up (the inputting of the electric source, the initial operation of the control CPU 225B and the peripheral circuit, and the initial operation of the mechanism portion 229B) of the print engine 22B is completed from the status information input and output portion 222B to the communication control portion 21 via the signal line 27B.

Moreover, in the printer device 20C, during the standby state of the printer device maintaining the USB interface, by shutting off the supply electric power to the plurality of connected print engines 22A and 22B, the electric power consumption of the standby state is reduced. For example, the input electric power of the Main electric sources 24A and 24B corresponding to each print engine 22A and 22B is cut off. Further, the oscillation motion of the switching electric source circuit, which constitutes the Main electric sources 24A and 24B corresponding to each print engine 22A and 22B, is stopped.

Further, the electric power is supplied to each print engine 22A and 22B while setting the Main electric sources 24A and 24B corresponding to each print engine 22A and 22B to be ON, and the control CPU 225A and 225B and each peripheral circuit in each print engine 22A and 22B are set to the low electric power consumption mode (the Sleep mode state, the Standby state or the operation clock reduction state of the CPU), whereby the electric power consumption of the standby state is reduced.

That is, in the printer device 20C, the communication control portion 21 responds to and deals with various commands using the control transmission from the information processing device 10 to the printer device 20C. Particularly, with respect to the start up command of the print operation from the information processing device 10 to the printer device 20C, the communication control portion 21 selects the suitable print engine from among the plurality of print engines 22A and 22B according to the start up command of the received print operation, performs the return processing from the printer standby state and shifts the state to the printable state.

In regard to the print request command including the print data using the bulk OUT transmission, the communication control portion 21 sends the print request command to the selected print engine in the original command state without changing the content thereof. The selected print engine responds to and deals with the print request command and performs the print processing according to the print data in the print request command.

In the printer device 20C, by maintaining the status information of each print engine 22A and 22B, in which the electric power is cut off or reduced corresponding to the respective print engines, in the first print engine state maintenance area and the second print engine state maintenance area of the print engine state maintenance RAM 214 in the communication control portion 21, in the status information request command of the print engine passing through the control transmission, the communication control portion 21 responds to the information processing device 10 based on the status information of each print engine 22A and 22B maintained in the print engine state maintenance RAM 214 of the communication control portion 21, without starting up the plurality of print engines 22A and 22B, and without querying the plurality of print engines 22A and 22B.

That is, as in the printing system 100C, a plurality of print engines 22A and 22B can be attached to and detached from one communication control portion 21 of the printer device 20A, in a printer standby state in which the electric power of a plurality of print engines 22A and 22B is reduced while maintaining the communication function of the communication control portion 21, the communication control portion 21 responds to and deals with the command using the control transmission from the information processing device 10 to the printer device 20C, with respect to the start up command of the print operation from the information processing device 10 to the printer device 20C, the communication control portion 21 selects the print engine among the plurality of print engines 22A and 22B according to the start up command of the received print operation, the selected print engine is controlled from the printer standby state to the printable state by the return processing, with respect to the print request command including the print data using the bulk OUT transmission from the information processing device 10 to the printer device 20C, the communication control portion 21 sends the print request command to the selected print engine in the original command state without changing the content thereof, the selected print engine responds to and deals with the print request command, and the print processing is carried out according to the print data in the print request command, whereby, regardless of the standby state and the normal state, the communication control portion 21 of the printer device 20C responds to and deals with the command of the control transmission, and the print engine deals with the command of the bulk OUT transmission, so that each CPU can effectively perform the distribution processing, it is possible to respond to and deal with the command of the control transmission even in the process of printing processing, the standby electric power consumption of the printer device 20C can be reduced to the extent that each country and various restrictions can be satisfied while maintaining the interface between the printer device 20C and the information processing device 10 in the efficient state.

6. Explanation of Fourth Detailed Example of Configuration of Printer Device (FIG. 12)

Next, a fourth detailed example of a configuration of a printer device in a printing system according to the present invention will be described with reference to FIG. 12.

A printing system 100D shown in FIG. 12 has a configuration that includes a plurality of single function printers having its own USB interface as a plurality of print engines 22A and 22B in the printer device 20C of the printing system 100C shown in FIG. 11.

A printer device 20D in the printing system 100D includes a communication control portion 300, two printer devices 320A and 320B, and a Sub electric source 330.

The communication control portion 300 in the printer device 20D includes a USB 2.0 function I/F controller 311, a storage portion 312, first and second USB 2.0 host I/F controllers 313A and 313B, a printer state maintenance RAM 314, a communication control CPU 315, a RAM 316, a ROM 317, an electric source switch 318 or the like that are connected to each other via a communication control portion control bus 310.

In addition, the printer device 20D includes a control transmission end point FIFO buffer 312A for the control transmission and a bulk OUT transmission end point FIFO buffer 312B for the bulk OUT transmission as the storage portion 312 within the communication control portion 300.

Moreover, in the printer state maintenance RAM 314 of the communication control portion 21, a first printer device state maintenance area which maintains the status information of the first printer device 320A, and a second printer device state maintenance area which maintains the status information of the second printer device 320B are provided.

The first printer device 320A includes a USB 2.0 function I/F controller 321A, a mechanism control portion 323A, a print head control portion 324A, a control CPU 325A, a RAM 326A, a ROM 327A, a mechanism portion 329A controlled by the mechanism control portion 323A, a print head 330A controlled by the print head control portion 324A, a Main electric source 340A or the like that are connected to each other via a control bus 350A.

Furthermore, the second printer device 320B includes an I/F controller 321B, a mechanism control portion 323B, a print head control portion 324B, a control CPU 325B, a RAM 326B, a ROM 327B, a mechanism portion 329B controlled by the mechanism control portion 323B, a print head 330B controlled by the print head control portion 324B, a Main electric source 340B or the like that are connected to each other via a control bus 350B.

In the printer device 20D, as a plurality of print engines connected to the communication control portion 300 via the USB, equipment itself, which is connected to the information processing device 10 as a single printer and functions as the printer device, is used.

That is, the communication control portion 300 in the printer device 20D is recognized as a single printer device from the information processing device 10, a plurality of USB host I/F function portions by the first and second USB 2.0 host controllers 313A and 313B is included in the communication control portion 300, and a plurality of printer devices 320A and 320B having the USB host function portion and the USB function portion by the USB 2.0 function I/F controllers 321A and 321B is connected to each other via the communication cables 301A and 301B suitable for the USB (Universal Serial Bus) interface, respectively.

The communication control portion 300 functions as the single printer device in which the properties of the plurality of connected print engines are aggregated. That is, single printer driver software is efficient in the information processing device 10. In a case of carrying out the print operation from the information processing device 10, corresponding to the desired setting selected among the respective parameter settings in the single printer driver, the communication control portion 300 starts up the specific print engine corresponding to the selection setting among the connected printer devices 320A and 320B, that is, the plurality of print engines and performs the print operation. The printer device, which was not selected and set, is not started up.

With this configuration, the communication control portion 300 functions as the print server and the plurality of single function print engines can concurrently be connected to the information processing device 10 via the USB interface.

The present application contains subject matter related to that disclosed in Japanese Priority Patent Application JP 2010-019261 filed in the Japan Patent Office on Jan. 29, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power into the print engine by a print request from the external equipment to perform the print processing in a printer standby state in which the electric power of the print engine is reduced while maintaining the communication function of the communication control portion, wherein, in the printer device, in a state in which a control transmission using a default pipe that is a logical connection of the USB interface and a bulk OUT transmission using a pipe that is a logical connection established after carrying out a configuration of the USB interface can be established between the printer device and the external equipment, the communication control portion responds to and deals with various commands using the control transmission from the external equipment, the communication control portion does not respond and deal with the print request command including the print data using the bulk OUT transmission from the external equipment, the print request command is supplied from the communication control portion to the print engine in the original command state without changing the content thereof, and the print engine responds to and deals with the print request command supplied from the communication control portion, whereby the print processing is carried out according to the print data in the print request command.

2. The printing system according to claim 1,
wherein the printer device performs a processing in which a communication control CPU of the communication control portion sends the print request command in an end point FIFO buffer corresponding to the logical connection pipe to the print engine in the state of the original print request command according to the processing of a piece of firmware with respect to a print request command which includes the print data using the bulk OUT transmission from the external equipment.

3. The printing system according to claim 1,
wherein the printer device performs a processing in which the print engine directly reads the print request command in the end point FIFO buffer corresponding to the logical connection pipe in the communication control portion, thereby reading the print request command into the print engine with respect to the print request command which includes the print data using the bulk OUT transmission from the external equipment.

4. The printing system according to claim 1,
wherein, in the printer device, in the printer standby state in which the electric power of the print engine is reduced, the communication control CPU in the communication control portion responds to and deals only with the various commands using the control transmission, and when a status information request command of the print engine using the control transmission is sent from the external equipment, the communication control portion does not start up the print engine and does not query the print engine, the communication control CPU in the communication control portion responds to the external equipment using the control transmission based on the status information of the print engine maintained in a print engine status information RAM within the communication control portion.

5. The printing system according to claim 1,
wherein, when the whole electric source is input, the printer device carries out an initial operation processing of a mechanism portion in the printer device, and when the electric power of the print engine is started up from the printer standby state, the printer device does not carry out the initial operation processing of the mechanism portion in the printer device.

6. The printing system according to claim 1,
wherein, the printer device includes a printer installation status change detection sensor, the printer installation status change detection sensor detects whether or not the installation status of the printer device is changed at the time of electric power cut-off or reduction of the print engine, and in a case where the change exists, even when the electric power of the print engine is started up from the printer standby state, the initial operation processing of the mechanism portion in the printer device is carried out.

7. A method of controlling a printer device in a printing system which has the printer device including a communication control portion and a print engine carrying out a print processing, and an information processing device connected to the printer device as external equipment via a USB interface, the printer device being connected to external equipment by the communication function of the communication control portion via a USB interface, and inputting the electric power into the print engine by a print request from the external equipment to perform the print processing in a printer standby state in which the electric power of the print engine is reduced while maintaining the communication function of the communication control portion, wherein, in a state in which a control transmission using a default pipe that is a logical connection of the USB interface and a bulk OUT transmission using a pipe that is a logical connection established after carrying out a configuration of the USB interface can be established between the external equipment and the printer device, the communication control portion responds to and deals with various commands using the control transmission from the external equipment to the printer device, and the communication control portion does not respond to and deal with the print request command including the print data using the bulk OUT transmission from the external equipment to the printer device, the print request command is supplied from the communication control portion to the print engine in the original command state without changing the content thereof, and the print engine responds to and deals with the print request command, whereby the print processing is carried out according to the print data in the print request command.

8. A printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power into the print engine via a print request from the external equipment to perform the print processing in a printer standby state in which the electric power of the print engine is reduced while maintaining the communication function of the communication control portion, wherein the printer device enables a control transmission using a default pipe that is a logical connection of the USB interface and a bulk OUT transmission using a pipe that is a logical connection established after carrying out a configuration of the USB interface between the printer device and the external equipment, wherein a control transmission end point FIFO buffer for the control transmission and a bulk OUT transmission end point FIFO buffer for the bulk OUT transmission exist within the communication control portion, a communication control CPU within the communication control portion accesses the control transmission end point FIFO buffer, a control CPU in the print engine accesses the bulk OUT transmission end point FIFO buffer, and when the print request command including the print data using the bulk OUT transmission is sent from the external equipment, the control CPU in the print engine directly reads the print request command from the bulk OUT transmission end point FIFO buffer within the communication control portion, thereby carrying out the print processing corresponding to the print data included in the print request command in the print engine.

9. The printing system according to claim 8, wherein, upon starting up the print operation, the print engine electric power control request command using the control transmission is sent from the external equipment to the printer device, and in the printer device, the communication control CPU in the communication control portion reads the print engine electric power control request command received from the control transmission end point FIFO buffer, thereby carrying out the start up control of the electric power to the print engine, wherein, next, the print request command including the print data using the bulk OUT transmission is sent from the external equipment to the printer device, and in the printer device, the control CPU in the print engine reads the print request command received from the bulk OUT transmission end point FIFO buffer in the communication control portion.

10. The printing system according to claim 8, wherein, in the printer device, before the start up of the print engine is completed, in a case where the print request command including the print data is sent from the external equipment, the communication control portion performs the reception refusal of the print request command.

11. The printing system according to claim 8, wherein, in the printer device, before the start up of the print engine is completed, in a case where the print request command including the print data is sent from the external equipment, the communication control portion receives a part of the print request command via an empty area portion in the FIFO within the communication control portion, and performs the reception refusal processing of the residual print request command after the FIFO is filled in a full state.

12. The printing system according to claim 10, wherein the printer device sends a print engine Ready state, which shows the completion of the start up of the print engine, from the print engine to the communication control portion, and when the communication control portion does not receive the print engine Ready state from the print engine, the communication control portion performs the reception refusal of the print request command.

13. The printing system according to claim 8, wherein, in the printer device, when the electric power of the print engine is in the printer standby state, the communication control CPU in the communication control portion responds to and deals with the control transmission, and when a status information request command of the print engine using the control transmission is sent from the external equipment, the communication control portion responds to the external equipment using the control transmission without starting up the print engine, based on the status information of the print engine maintained in a print engine status information RAM within the communication control portion.

14. The printing system according to claim 8, wherein, when the whole electric source is input, the printer device carries out an initial operation processing of a mechanism portion in the printer device, and when the electric power of the print engine is started up from the printer standby state, the printer device does not carry out the initial operation processing of the mechanism portion in the printer device.

15. The printing system according to claim 8, wherein, the printer device includes a printer installation status change detection sensor, the printer installation status change detection sensor detects whether or not the installation status of the printer device is changed at the time of electric power cut-off or reduction of the print engine, and in a case where the change exists, even when the electric power of the print engine is started up from the printer standby state, the initial operation processing of the mechanism portion in the printer device is carried out.

16. A method of controlling a printer device in a printing system which has a printer device including a communication control portion and a print engine carrying out a print processing, and an information processing device connected to the printer device as external equipment via a USB interface, the printer device being connected to external equipment by the communication function of the communication control portion via a USB interface, and inputting the electric power into the print engine by a print request from the external equipment to perform the print processing in a printer standby state in which the electric power of the print engine is reduced while maintaining the communication function of the communication control portion, wherein a control transmission using a default pipe that is a logical connection of the USB interface and a bulk OUT transmission using a pipe that is a logical connection established after carrying out a configuration of the USB interface can be performed between the external equipment and the printer device, and a control transmission end point FIFO buffer for the control transmission and a bulk OUT transmission end point FIFO buffer for the bulk OUT transmission exist within the communication control portion of the printer device, wherein a communication control CPU within the communication control portion accesses the control transmission end point FIFO buffer, wherein a control CPU in the print engine accesses the bulk OUT transmission end point FIFO buffer, and wherein, when the print request command including the print data using the bulk OUT transmission is sent from the external equipment, the control CPU in the print engine directly reads the print request command from the bulk OUT transmission end point FIFO buffer within the communication control portion, thereby carrying out the print processing corresponding to the print data included in the print request command in the print engine.

17. The printing system according to claim 11, wherein the printer device sends a print engine Ready state, which shows the completion of the start up of the print engine, from the print engine to the communication control portion, and when the communication control portion does not receive the print engine Ready state from the print engine, the communication control portion performs the reception refusal of the print request command.

\* \* \* \* \*